United States Patent
Karpman et al.

(10) Patent No.: US 10,190,503 B2
(45) Date of Patent: Jan. 29, 2019

(54) COMPACT AERO-THERMO MODEL BASED TIP CLEARANCE MANAGEMENT

(71) Applicant: UNITED TECHNOLOGIES CORPORATION, Farmington, CT (US)

(72) Inventors: Boris Karpman, Marlborough, CT (US); Ian Michael Dinsmore, Vernon, CT (US); Richard P. Neisner, Glastonbury, CT (US); John L. Shade, Portland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 416 days.

(21) Appl. No.: 14/765,953

(22) PCT Filed: Mar. 14, 2014

(86) PCT No.: PCT/US2014/027848
§ 371 (c)(1),
(2) Date: Aug. 5, 2015

(87) PCT Pub. No.: WO2014/143751
PCT Pub. Date: Sep. 18, 2014

(65) Prior Publication Data
US 2015/0378364 A1 Dec. 31, 2015

Related U.S. Application Data

(60) Provisional application No. 61/800,440, filed on Mar. 15, 2013.

(51) Int. Cl.
G05D 7/06 (2006.01)
G05B 17/02 (2006.01)
(Continued)

(52) U.S. Cl.
CPC .............. F02C 7/26 (2013.01); F01D 21/003 (2013.01); F02C 3/04 (2013.01); F02C 9/16 (2013.01);
(Continued)

(58) Field of Classification Search
CPC ...... F02C 7/26; F02C 3/04; F02C 9/16; F02C 9/20; G05B 23/0254; G05B 13/04;
(Continued)

(56) References Cited

U.S. PATENT DOCUMENTS 4,189,939 A 2/1980 West et al.
4,215,412 A 7/1980 Bernier et al.
(Continued)

FOREIGN PATENT DOCUMENTS

CN 1580496 A 2/2005
EP 1749968 A2 2/2007
(Continued)

OTHER PUBLICATIONS

English Abstract for JP2005502947 (A).
(Continued)

*Primary Examiner* — Charles R Kasenge
(74) *Attorney, Agent, or Firm* — Cantor Colburn LLP

(57) ABSTRACT

Systems and methods for controlling a fluid based engineering system are disclosed. The systems and methods may include a model processor for generating a model output, the model processor including a set state module for setting dynamic states of the model processor, the dynamic states input to an open loop model based on the model operating mode, wherein the open loop model generates a current state model as a function of the dynamic states and the model input, wherein a constraint on the current state model is based a series of cycle synthesis modules, each member of the series of cycle synthesis modules modeling a component
(Continued)

of a cycle of the control system and including a series of utilities, the utilities are based on mathematical abstractions of physical properties associated with the component, the series of cycle synthesis modules including a rotary apparatus module which estimates a tip clearance between the rotor and the rotor case. The model processor may further include an estimate state module for determining an estimated state of the model based on a prior state model output and the current state model of the open loop model.

20 Claims, 11 Drawing Sheets

(51) Int. Cl.
| | |
|---|---|
| F02C 7/26 | (2006.01) |
| F02C 9/20 | (2006.01) |
| F01D 21/00 | (2006.01) |
| F02C 9/16 | (2006.01) |
| F02C 3/04 | (2006.01) |
| F04D 29/32 | (2006.01) |
| G05B 13/04 | (2006.01) |
| G05B 23/02 | (2006.01) |

(52) U.S. Cl.
CPC .............. *F02C 9/20* (2013.01); *F04D 29/321* (2013.01); *F04D 29/325* (2013.01); *G05B 13/04* (2013.01); *G05B 17/02* (2013.01); *G05B 23/0254* (2013.01); *G05D 7/0629* (2013.01); *F05D 2220/32* (2013.01); *F05D 2240/35* (2013.01); *F05D 2260/81* (2013.01); *F05D 2260/85* (2013.01)

(58) Field of Classification Search
CPC ..... G05B 17/02; F04D 29/325; F04D 29/321; F01D 21/003; G05D 7/0629; F05D 2220/32; F05D 2240/35; F05D 2260/81; F05D 2260/85
See application file for complete search history.

(56) References Cited

U.S. PATENT DOCUMENTS

| 4,249,238 A | 2/1981 | Spang, III et al. |
|---|---|---|
| 4,313,167 A | 1/1982 | Brown |
| 5,010,473 A | 4/1991 | Jacobs |
| 5,202,525 A | 4/1993 | Coffinberry |
| 5,435,694 A | 7/1995 | Kray et al. |
| 5,889,205 A | 3/1999 | Trinies et al. |
| 5,901,059 A | 5/1999 | Tao et al. |
| 6,478,539 B1 | 11/2002 | Trutschel |
| 6,487,491 B1 | 11/2002 | Karpman et al. |
| 6,823,675 B2 | 11/2004 | Brunell et al. |
| 7,079,957 B2* | 7/2006 | Finnigan ............... F01D 11/025 415/173.2 |
| 7,215,129 B1* | 5/2007 | Andarawis ............ F01D 21/003 324/661 |
| 7,549,846 B2 | 6/2009 | Dube et al. |
| 7,628,062 B2 | 12/2009 | Healy et al. |
| 7,630,820 B2 | 12/2009 | Sims et al. |
| 7,644,574 B2 | 1/2010 | Feiz |
| 7,685,802 B2 | 3/2010 | Feiz |
| 7,882,789 B2 | 2/2011 | Kumar et al. |
| 8,056,317 B2 | 11/2011 | Feiz |
| 8,056,344 B2 | 11/2011 | Remy et al. |
| 8,065,022 B2 | 11/2011 | Minto et al. |
| 8,090,456 B2 | 1/2012 | Karpman et al. |
| 8,131,384 B2 | 3/2012 | Karpman et al. |
| 8,315,741 B2 | 11/2012 | Karpman et al. |
| 8,321,104 B2* | 11/2012 | Mahmood ............... F01D 11/24 701/100 |
| 8,475,118 B2* | 7/2013 | Mulcaire ................ F01D 11/24 415/134 |
| 8,668,434 B2 | 3/2014 | Karpman et al. |
| 8,720,258 B2 | 5/2014 | Meisner et al. |
| 8,903,753 B2 | 12/2014 | Hannula et al. |
| 9,170,573 B2 | 10/2015 | Kihas |
| 9,255,492 B2* | 2/2016 | Bacic ...................... F01D 11/24 |
| 9,429,085 B2 | 8/2016 | Whitney et al. |
| 9,470,113 B2 | 10/2016 | Mazzaro et al. |
| 9,476,690 B2* | 10/2016 | Javelot ................... F01D 11/24 |
| 9,481,473 B2 | 11/2016 | Skertic |
| 9,534,547 B2 | 1/2017 | Livshiz et al. |
| 9,540,944 B2 | 1/2017 | Meisner et al. |
| 9,581,080 B2 | 2/2017 | Huang et al. |
| 2004/0088100 A1 | 5/2004 | Volponi |
| 2004/0093151 A1 | 5/2004 | Zagranski et al. |
| 2005/0149274 A1* | 7/2005 | Finnigan ............... F01D 11/025 702/33 |
| 2005/0193739 A1 | 9/2005 | Brunell et al. |
| 2006/0013681 A1* | 1/2006 | Cardarella, Jr. ........ F01D 11/02 415/1 |
| 2006/0051197 A1 | 3/2006 | Regunath |
| 2006/0212281 A1 | 9/2006 | Mathews, Jr. et al. |
| 2007/0118270 A1 | 5/2007 | Wiseman et al. |
| 2007/0118271 A1 | 5/2007 | Wiseman et al. |
| 2008/0167852 A1 | 7/2008 | Bartee et al. |
| 2008/0178600 A1 | 7/2008 | Healy et al. |
| 2008/0270003 A1 | 10/2008 | Sims et al. |
| 2009/0012762 A1 | 1/2009 | Ellis et al. |
| 2009/0037035 A1* | 2/2009 | Hershey ................. F01D 11/24 701/3 |
| 2009/0177291 A1 | 7/2009 | Boe et al. |
| 2010/0024536 A1 | 2/2010 | Adibhatla et al. |
| 2010/0034645 A1* | 2/2010 | Mulcaire ................ F01D 11/24 415/173.3 |
| 2010/0188100 A1 | 7/2010 | Andarawis et al. |
| 2010/0269481 A1 | 10/2010 | Snider et al. |
| 2011/0052370 A1 | 3/2011 | Karpman et al. |
| 2011/0054704 A1* | 3/2011 | Karpman ................. F02C 9/28 700/282 |
| 2011/0071692 A1 | 3/2011 | D'Amato et al. |
| 2011/0077783 A1 | 3/2011 | Karpman et al. |
| 2011/0153295 A1 | 6/2011 | Yerramalla et al. |
| 2011/0160979 A1 | 6/2011 | Muller |
| 2011/0230981 A1 | 9/2011 | Karpman et al. |
| 2011/0231021 A1 | 9/2011 | Karpman et al. |
| 2011/0243708 A1* | 10/2011 | Hafner .................... F01D 11/20 415/1 |
| 2012/0003623 A1 | 1/2012 | Bartee et al. |
| 2012/0201651 A1* | 8/2012 | Gaully ................... F01D 11/24 415/1 |
| 2013/0024179 A1 | 1/2013 | Mazzaro et al. |
| 2013/0045098 A1* | 2/2013 | Taylor ................... F03D 7/0224 416/1 |
| 2013/0046507 A1 | 2/2013 | Vega et al. |
| 2013/0068024 A1* | 3/2013 | Xu ........................... G01B 15/00 73/579 |
| 2013/0073170 A1 | 3/2013 | Drohan et al. |
| 2013/0124177 A1 | 5/2013 | Falagas |
| 2013/0152601 A1* | 6/2013 | Bacic ...................... F01D 11/24 60/782 |
| 2013/0323016 A1* | 12/2013 | Javelot ................... F01D 11/24 415/1 |
| 2014/0107993 A1 | 4/2014 | Cheng |
| 2015/0369136 A1 | 12/2015 | Karpman et al. |
| 2015/0370233 A1 | 12/2015 | Karpman et al. |
| 2015/0378334 A1 | 12/2015 | Karpman et al. |
| 2016/0003164 A1 | 1/2016 | Karpman et al. |
| 2016/0003165 A1 | 1/2016 | Karpman et al. |
| 2016/0017813 A1 | 1/2016 | Karpman et al. |
| 2016/0017814 A1 | 1/2016 | Karpman et al. |
| 2016/0146109 A1 | 5/2016 | Karpman et al. |

FOREIGN PATENT DOCUMENTS

| EP | 2045673 A2 | 4/2009 |
|---|---|---|
| EP | 2149824 A2 | 2/2010 |
| EP | 2239441 A2 | 10/2010 |

(56) References Cited

FOREIGN PATENT DOCUMENTS

| | | |
|---|---|---|
| JP | S5781131 | 5/1982 |
| JP | 05044691 | 2/1993 |
| JP | H0693880 | 4/1994 |
| JP | H0883104 | 3/1996 |
| JP | H11259947 | 9/1999 |
| JP | 2001184121 | 7/2001 |
| JP | 2004162698 | 6/2004 |
| JP | 2005502947 A | 1/2005 |
| JP | 2005171789 | 6/2005 |
| JP | 2005267633 | 9/2005 |
| JP | 2006057595 | 3/2006 |
| JP | 2009041565 | 2/2009 |
| JP | 2009163507 | 7/2009 |
| JP | 2010-090896 A | 4/2010 |
| KR | 1020040033315 A | 4/2004 |

OTHER PUBLICATIONS

English Abstract for KR20040033315(A); Publication date: Apr. 21, 2004; 2 pgs.
English Machine Translation to JP05044691.
English Machine Translation to JP2010090896 (A).
European Search Report for Application No. EP 14 76 9973.
International Search Report and Written Opinion for related PCT Application No. PCT/US14/27877; report dated Jul. 22, 2014; 9 pages.
International Search Report Application No. PCT/US2014/027601, dated Jul. 21, 2014.
International Search Report Application No. PCT/US2014/027780, dated Jun. 26, 2014.
International Search Report for International Application No. PCT/US2014/027808; International filing Date: Mar. 14, 2014; dated Jul. 22, 2014; 2 pgs.
International Search Report; PCT/US2014/028002; dated Jul. 29, 2014; 3 Pages.
Kaikko et al: "Technical and economic performance comparison between recuperated and non-recuperated variable-speed micoturbines in combined heat and power generation", Applied Thermal Engineering, Pergamon, Oxford, GB, vol. 27, No. 13, May 16, 2007 pp. 2173-2180.
PCT International Search Report and Written Opinion for International application No. PCT/US2014/027636; International filing date: Mar. 14, 2014; dated Jul. 22, 2014; 9 pgs.
PCT International Search Report and Written Opinion for International application No. PCT/US2014/027979; International filing date: Mar. 14, 2014; dated Jun. 26, 2014; 10 pgs.
Supplementary European Search Report for Application No. EP 14 76 4449.
Supplementary European Search Report for Application No. EP 14 76 5310.
International Search Report for related PCT Application No. PCT/US14/27848; report dated Aug. 28, 2014.
European Search Report for Application No. 14763089.1-1807; dated Jan. 5, 2017; 10 pgs.
European Search Report for Application No. 14764867.9-1927; dated Jan. 16, 2017; 9 pgs.
European Search Report for Application No. 14765556.7-1807; dated Jan. 5, 2017; 10 pgs.
European Search Report for Application No. 14765636.7-1927; dated Jan. 9, 2017; 10 pgs.
European Search Report for Application No. 14763322.6-1807; dated Jan. 5, 2017; 9 pgs.
European Search Report for Application No. 14770532.1-1807; dated Jan. 5, 2017; 9 pgs.
International Search Report and Written Opinion for Related PCT Application No. PCT/US14/27848; Report dated Aug. 28, 2014; 7 pages.
International Search Report for International application No. PCT/2014/026062; dated Jul. 18, 2014; 2 pgs.
JP Patent Application No. 2016-502490 Notice of Reasons for Rejection dated Feb. 6, 2018, 2 pages.
JP Patent Application No. 2016-502500 Notice of Reasons for Rejection dated Jan. 30, 2016, 5 pages.
JP Patent Application No. 2016-502623 Notice of Reasons for Rejection dated Jan. 30, 2018, 5 pages.
JP Patent Application No. 2016-502631 Notice of Reasons for Rejection dated Jan. 30, 2018, 2 pages.
JP Patent Application No. 2016-502674 Notice of Reasons for Rejection dated Feb. 20, 2018, 4 pages.
JP Patent Application No. 2016-502682 Notice of Reasons for Rejection dated Mar. 6, 2018, 5 pages.
JP Patent Application No. 201-502652 Notice of Reasons for Rejection dated Feb. 20, 2018, 4 pages.
JP Patent Application No. 2016-502641 Notice of Reasons for Refusal dated Feb. 27, 2018, 2 pages.
JP Patent Application No. JP2016-502682 Notice of Reasons for Refusal dated Jul. 17, 2018, 4 pages.

\* cited by examiner

COMPACT AERO-THERMO MODEL BASED TIP CLEARANCE MANAGEMENT

This application is a US National Stage under 35 USC § 371 of International Patent Application No. PCT/US14/27848 filed on Mar. 14, 2014, and claims priority under 35 USC § 119(e) to U.S. Provisional Patent Application Ser. No. 61/800,440 filed on Mar. 15, 2013.

TECHNICAL FIELD OF THE DISCLOSURE

The present disclosure relates to the design and control of engineering systems, and more particularly, to design and control of fluid-based engineering systems.

BACKGROUND OF THE DISCLOSURE

Fluid-based engineering systems are widely used and may include gas turbine engines for aviation and power generation, HVAC&R (heating, ventilation, air-conditioning and refrigeration), fuel cells, and other, more generalized fluid processing systems for hydrocarbon extraction, materials processing, and manufacture. These systems may contain any or all of the following components: turbo-machinery, fuel cell stacks, electric motors, pipes, ducts, valves, mixers, nozzles, heat exchangers, gears, chemical apparatuses and other devices for generating or modifying a fluid flow.

Each of these applications places different operational demands on the engineering control system. In gas turbine engine applications, for example, the relevant cycle is typically a Brayton turbine or first Ericsson cycle, and the basic thermodynamic parameters (or process variables) are the pressure, temperature and flow rate of the working fluid at the inlet, compressor, combustor, turbine, and exhaust. The parameters may be related to the overall thrust, rotational energy, or other measure of power output. In order to precisely control this output while maintaining safe, reliable and efficient engine operation, the engineering control system must be fast, accurate, robust, and provide real-time control capability across all required performance levels. While the relevant process variables vary depending on the system type and configuration, the need for precise, efficient and reliable engineering control remains the same, as do the economic constraints on overall cost and operational/maintenance requirements.

Further, because direct measurements of system parameters controlled may not be possible (due to undeveloped technology, prohibitive cost, unreliable equipment, etc.), the control system may require real time estimation of system parameters. In particular, such a control system may wish to monitor parameters associated with tip clearance in a rotor based apparatus. System parameters may be mathematical abstractions of engineering systems and/or process for a given set of measured inputs used as control feedback.

In the past, control systems for such fluid-based engineering systems relied on piecewise linear state variable representations. These control systems, by their nature, were limited to relatively simple non-linear systems. Another approach used in the past relies on semi-empirical relationships that tie important system parameters to control sensors; the drawback of such a system is that it may lack accuracy and is expensive due to the additional hardware required for implementation. Other attempts have been made to deploy stationary simulations in a retail environment; however, by their nature, these models are large, use iterative solvers, have high maintenance cost and lack robustness critical in a real time environment.

A known approach to modern fluid-based engineering system control is the use of component level physics based non-iterative mathematical abstractions of fluid-based engineering systems. These mathematical abstractions are conceptualized in a software environment specific to the applied fluid-based engineering system. Such example systems and methods for engineering system control are further detailed in U.S. Pat. No. 8,090,456 ("System and method for design and control of engineering systems utilizing component-level dynamic mathematical model"), which is hereby incorporated by reference.

A need exists for an engine parameter on-board synthesis (EPOS) in the real-time control system of a fluid based engineering system that may overcome the computational inefficiencies of prior EPOS models. In particular, control systems for fluid-based engineering systems that control and/or monitor tip clearance of components of fluid-based engineering are needed. Thusly, an EPOS providing said functionality that may overcome the computational inefficiencies of prior EPOS models is needed.

SUMMARY OF THE DISCLOSURE

In accordance with an aspect of the disclosure, a control system is disclosed. The control system may include an actuator for positioning a control device, the control device comprising a rotary apparatus including a rotor and a rotor case, wherein the actuator positions the control surface in order to control a model state. The system may include a control law for directing the actuator as a function of a model output. The control system may include a model processor for generating the model output, the model processor including an input object for processing model input and setting a model operating mode, a set state module for setting dynamic states of the model processor, the dynamic states input to an open loop model based on the model operating mode, wherein the open loop model generates a current state model as a function of the dynamic states and the model input, wherein a constraint on the current state model is based a series of cycle synthesis modules, each member of the series of cycle synthesis modules modeling a component of a cycle of the control device and comprising a series of utilities, the utilities are based on mathematical abstractions of physical properties associated with the component. The series of cycle synthesis modules may include a rotary apparatus module which estimates a tip clearance between the rotor and the rotor case. The model processor may further include an estimate state module for determining an estimated state of the model based on a prior state model output and the current state model of the open loop model and an output object for processing the estimated state of the model to determine the model output.

In a refinement, the rotary apparatus module may estimate temperature and rate of temperature change values for the rotor and temperature and rate of temperature change values for the rotor case.

In a further refinement, the rotary apparatus module may estimate a radial growth of the rotor based on the temperature and rate of temperature change values for the rotor and may estimate a radial growth of the rotor case based on the temperature and rate of temperature change values for the rotor case.

In a further refinement, the rotary apparatus module may estimate the tip clearance between the rotor and the rotor case based on the estimated radial growth of the rotor and the estimated radial growth of the rotor case.

In a refinement, the control law may direct the actuators to control a flow in a gas path of the rotary apparatus based on the tip clearance.

In a further refinement, the control law may direct the actuator to regulate a coolant flow onto the rotor case to maintain a desired tip clearance between the rotor and the rotor case.

In a refinement, the rotary apparatus may include at least one of a compressor element or a turbine element.

In a refinement, the estimated tip clearance is based on one or more of material temperature estimations, rotary speed calculations, gas path pressure estimations, and mechanical growth estimations.

In a refinement, the control device is a gas turbine engine.

In accordance with another aspect of the disclosure, a method for controlling a control device is disclosed. The control device may include a rotary apparatus including a rotor and a rotor case. The method may include generating a model output using a model processor. The control system may include a model processor for generating the model output, the model processor including an input object for processing model input and setting a model operating mode, a set state module for setting dynamic states of the model processor, the dynamic states input to an open loop model based on the model operating mode, wherein the open loop model generates a current state model as a function of the dynamic states and the model input, wherein a constraint on the current state model is based a series of cycle synthesis modules, each member of the series of cycle synthesis modules modeling a component of a cycle of the control device and comprising a series of utilities, the utilities are based on mathematical abstractions of physical properties associated with the component. The series of cycle synthesis modules may include a rotary apparatus module which estimates a tip clearance between the rotor and the rotor case. The model processor may further include an estimate state module for determining an estimated state of the model based on a prior state model output and the current state model of the open loop model and an output object for processing the estimated state of the model to determine the model output. The method may further include directing an actuator associated with the control device as a function of a model output using a control law and positioning the control device using the actuator, wherein the actuator positions the control device in order to control the model state.

In a refinement, the rotary apparatus module may estimate temperature and rate of temperature change values for the rotor and temperature and rate of temperature change values for the rotor case.

In a further refinement, the rotary apparatus module may estimate a radial growth of the rotor based on the temperature and rate of temperature change values for the rotor and may estimate a radial growth of the rotor case based on the temperature and rate of temperature change values for the rotor case.

In a further refinement, the rotary apparatus module may estimate the tip clearance between the rotor and the rotor case based on the estimated radial growth of the rotor and the estimated radial growth of the rotor case.

In a refinement, the control device may be a gas turbine engine and the one or more cycle synthesis modules may be based on one or more mathematical abstractions of physical processes associated with components of a thermodynamic cycle of the gas turbine engine.

In a refinement, further comprising directing the actuator, using the control law, to regulate a coolant flow onto the rotor case to maintain a desired tip clearance between the rotor and the rotor case based on the estimated tip clearance.

In accordance with another aspect of the disclosure, a gas turbine engine is disclosed. The gas turbine engine may include a fan, a compressor section downstream of the fan, a combustor section downstream of the compressor section. The turbine section may include a turbine rotor and a turbine case. Further, the gas turbine engine may include an actuator for positioning the gas turbine engine comprising a control surface, wherein the actuator positions the control surface in order to control a model state. The gas turbine engine may include a control law for directing the actuator as a function of a model output. The gas turbine engine may include a model processor for generating the model output, the model processor including an input object for processing model input and setting a model operating mode, a set state module for setting dynamic states of the model processor, the dynamic states input to an open loop model based on the model operating mode, wherein the open loop model generates a current state model as a function of the dynamic states and the model input, wherein a constraint on the current state model is based a series of cycle synthesis modules, each member of the series of cycle synthesis modules modeling a component of a cycle of the gas turbine engine and comprising a series of utilities, the utilities are based on mathematical abstractions of physical properties associated with the component. The series of cycle synthesis modules may include a turbine module, which estimates a tip clearance between the turbine rotor ant the turbine case. The model processor may further include an estimate state module for determining an estimated state of the model based on a prior state model output and the current state model of the open loop model and an output object for processing the estimated state of the model to determine the model output.

In a refinement, the turbine module may estimate temperature and rate of temperature change values for the turbine rotor and temperature and rate of temperature change values for the turbine case.

In a further refinement, the turbine module may estimate a radial growth of the turbine rotor based on the temperature and rate of temperature change values for the turbine rotor and may estimate a radial growth of the turbine case based on the temperature and rate of temperature change values for the turbine case.

In a further refinement, the turbine module may estimate the tip clearance between the turbine rotor and the turbine case based on the estimated radial growth of the turbine rotor and the estimated radial growth of the turbine case.

In a refinement, the control law may direct the actuator to regulate a coolant flow onto the turbine case to maintain a desired tip clearance between the turbine rotor and the turbine case.

It should be understood that the drawings are not necessarily to scale. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
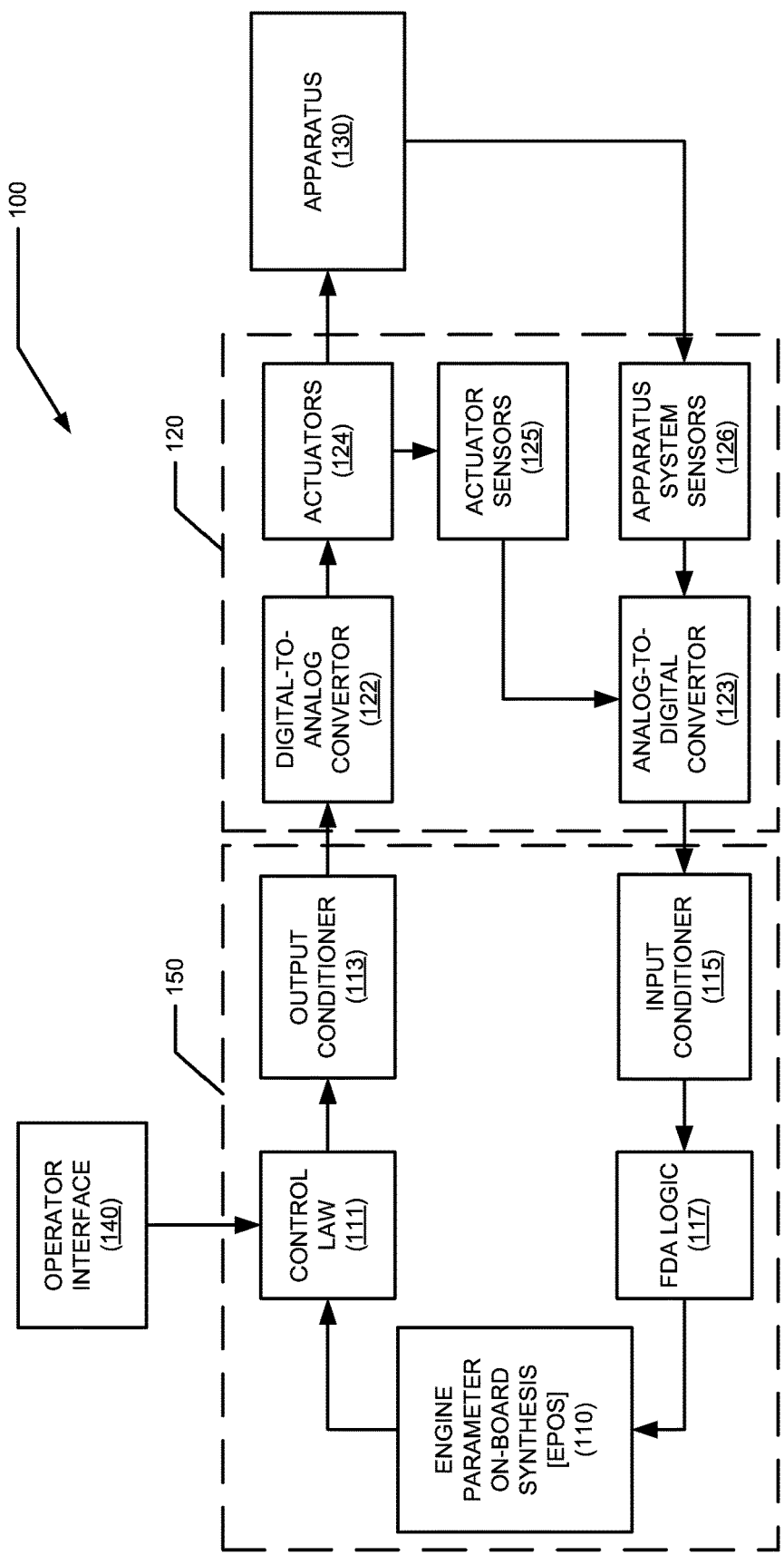
FIG. 1 is a block diagram of an exemplary control system for a fluid-based engineering system.

Referring to the drawings and with specific reference to FIG. 1, a control system for a fluid-based engineering system in accordance with the present disclosure is generally referred to by reference numeral 100. Control demands may be generated by an operator interface 140 and may be received by the engine parameter on board synthesis (EPOS) 110. For example, the operator interface 140 may be a real-time interface such as a cockpit navigation system and/or an operator workstation. Additionally or alternatively, the operator interface 140 may include another, more generalized process control interface, which is suitable for logging control commands to software control components 150, including, for example, a guidance, navigation, and control computer or autopilot system(s). Further, control demands may be generated by an internal memory or any other internal programming operatively associated with software control elements 150.

The control elements 150 may include EPOS 110 and a control law 111 that may generate and/or process control instructions for the apparatus 130. The EPOS 110 and control law 111 may be implemented as software modules designed to monitor, control, or otherwise act in associative function with regards to an apparatus 130. The control law 111 may obtain control feedbacks from the EPOS 110 and control commands from the operator interface 140. The control law 111 may generate control requests in engineering units to be processed by hardware control elements 120 to control the apparatus 130.

Additionally, the software control components 150 may include an output conditioner 113 and/or an input conditioner 115 to process output and/or input data for the data's respective input/output destination. The input to the EPOS 110, provided by the input conditioner 115, may be processed by fault detection and accommodation (FDA) logic 117 to detect range faults as well as in-range failures (e.g., rate-limit, cross-channel mismatch, etc.) and provide a reasonable input value along with a health status indication for the input.

Further, the hardware control components 120 may convert digital data generated by the software control components 150 to an analog form readable by the apparatus 130 (e.g., electrical signals), convert analog data generated by the apparatus 130 into digital data readable software components 150, condition such input and output data for readability, and/or control actuators 124 associated with the apparatus 130. The digital-to-analog convertor 122 can transform digital signals generated by the control law 111 into actuator requests. The actuators 124 may be one or more devices which use control hardware to position various control components of the apparatus 130 in accordance with instructions generated by the EPOS 110. Actuators, such as the actuators 124, may be designed to provide quick and accurate control of an apparatus.

Actuator sensors 125 may be included to measure various states of the actuators 124, wherein the actuator states (or positions) may be related to the physical configuration of the various control components of the apparatus 130. For example, fluid-based systems often include actuators whose linear or angular positions are sensed by actuator sensors 124, and which are related to the physical position of control surfaces or other control devices located proximate to a compressor, combustor, turbine and/or nozzle/exhaust assembly.

Further, the hardware control components 120 may include apparatus system sensors 126. The apparatus system sensors 126 may measure operational parameters associated with the apparatus 130. For example, fluid-based systems may include apparatus system sensors 126 that measure the working fluid pressure, temperature and fluid flow at various axial and radial locations in the flow path. Apparatus system sensors 126 may comprise a variety of different sensing devices, including, but not limited to, temperature sensors, flow sensors, vibration sensors, debris sensors, current sensors, voltage sensors, level sensors, altitude sensors and/or blade tip sensors. Apparatus system sensors 126 may be positioned to measure operational parameters related to the function of apparatus 130, e.g., parameters related to control commands submitted to EPOS 110 and control requests generated by EPOS 110 in order to direct actuators 124 to control apparatus 130.

Both the apparatus system sensors 126 and the actuator sensors 125 may produce electrical signals based upon a read-out result from said sensors. The electrical signals produced by the actuator sensors 125 and the apparatus system sensors 126 may be transmitted to an analog-to-digital convertor 123. The analog-to-digital convertor may convert the electrical signals into digital signal data which may be compatible with and read by the EPOS 110 after processing by the input conditioning module 115.

The apparatus 130 may be any fluid-based engineering system. Example fluid-based engineering systems may include gas turbine engines for aviation and power generation, HVAC&R (heating, ventilation, air-conditioning and refrigeration), fuel cells, and other, more generalized fluid processing systems for hydrocarbon extraction, materials processing, and manufacture. In various embodiments, the physical components of apparatus 130 include, but are not limited to including, compressors, combustors, turbines, shafts, spools, fans, blowers, heat exchangers, burners, fuel cells, electric motors and generators, reactor vessels, storage vessels, fluid separators, pipes, ducts, valves, mixers and other fluid processing or flow control devices.

In some examples, the apparatus 130 may perform a thermodynamic cycle on a working fluid in order to generate rotational energy, electrical power or reactive trust, to provide heating, ventilation, air conditioning and refrigeration, or to perform other fluid processing functions. The range of available cycles includes, but is not limited to, the following cycles and their derivatives: Otto cycles, Diesel cycles, Brayton turbine (or first Ericsson) cycles, Brayton jet (Barber/Joule) cycles, Bell-Coleman (reverse Brayton) cycles, Ericsson (Second Ericsson) cycles, Lenoir (pulse-jet) cycles, and Carnot, Stoddard and Stirling cycles. Additionally or alternatively, apparatus 130 may perform a number of individual thermodynamic processes for heating, cooling, flow control, or for processing applications in agriculture, transportation, food and beverage production, pharmaceutical production, or manufacturing, or for the extraction, transportation or processing of a hydrocarbon fuel. The range of available thermodynamic processes includes, but is not limited to, adiabatic, isothermal, isobaric, isentropic, and isometric (isochoric or isovolumetric) transformations, exothermic reactions, endothermic reactions and phase changes.

In the present example, the apparatus 130 is a gas turbine engine. As such, the monitored aspects of the apparatus 130 may include, but are not limited to, a compressor, combustor, turbine and/or nozzle/exhaust assembly. In an application for a gas turbine engine, the input and output values received/generated by the EPOS 110 may be vectors representing values for positions (i.e., nozzle areas, variable vane angles, flow path areas, etc.), states, and actual sensed values of parameters (i.e., spool speeds, gas path temperatures, pressures proximate to components, flow rates proximate to components, etc.) related to the components of a gas turbine engine (i.e., a compressor, combustor, turbine and/or nozzle/exhaust assembly, etc.).

The data processed by the EPOS 110 are vectors containing parameters related to functions of the apparatus 130. Example input vectors for the EPOS 110 may include an external inputs vector ($U_E$) and a corrector truth vector ($Y_{Ct}$). $U_E$ may contain values for external inputs to be processed by the EPOS 110. $U_E$ may describe the configurations, positions and states of various control elements in the apparatus 130. In a gas turbine engine, for example, individual elements of external inputs vector $U_E$ may have a set of values related to effector position; these effector position values may describe fuel flow rates, nozzle areas, variable vane angles, flow path orifice areas, and other control element parameters. Further, $U_E$ may have a set of values related to boundary conditions related to the operation of apparatus 130. Some boundary conditions may be directly measured by apparatus system sensors 126, such as fluid temperatures, pressures and flow rates at physical boundaries of apparatus 130. In fluid-based applications, the boundary conditions may include boundary flow conditions and inlet and outlet locations. Other boundary conditions specific to aircraft applications include, but are not limited to, flight velocity, altitude, and bleed or power extractions parameters.

The corrector truth vector $Y_{Ct}$ may contain data associated with real time execution of the control system and describe the actual (sensed) values of the parameters related to the operation of apparatus 130. The elements of $Y_{Ct}$ may be based on measurements taken by the actuator sensors 125 and/or the apparatus system sensors 126. Further, elements of $Y_{Ct}$ may be based on values derived from a well-understood and trusted model of sensed parameters; for example, a flow rate model based on a differential pressure drop across a Pitot tube or Venturi tube. For gas turbine engines, typical $Y_{Ct}$ vector elements include, but are not limited to, spool speeds, gas path temperatures, and/or pressures all values of which may be proximate to engine components such as compressors, combustors, and turbines. In the context of non-real time applications, including calibration, $Y_{Ct}$ may correspond to high fidelity data which can either be physically tested or model-based.

Figure 2:
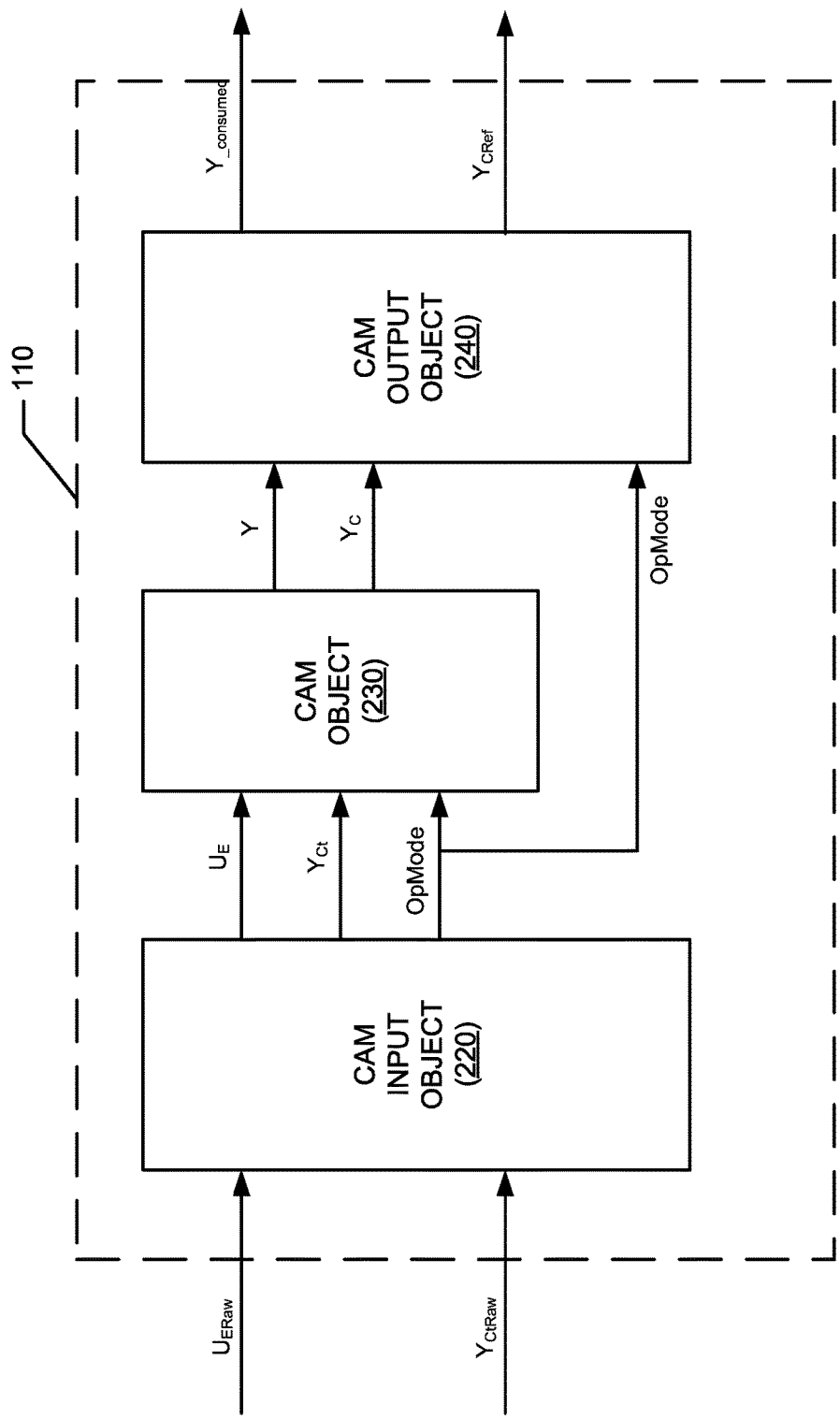
FIG. 2 is a block diagram of an exemplary engine parameter on-board synthesis (EPOS) module of the control system of FIG. 1.

Employing the compact aero-thermal model (CAM) of the present disclosure, FIG. 2 illustrates an embodiment of the EPOS 110 of FIG. 1 in further detail. The EPOS 110 of FIG. 2 may include, but is not limited to including a CAM input object 220, a compact aero-thermal model (CAM) object 230, and a CAM output object 240. The EPOS 110 may receive raw input data related to vectors $U_{ERaw}$ and $Y_{CtRaw}$. $U_{ERaw}$ may contain values obtained from the actuator sensors 125, the apparatus system sensors 126 and/or any other associated sensors and/or inputs. $Y_{CtRaw}$ may contain values obtained from the actuator sensors 125, the apparatus system sensors 126 and/or any other associated sensors and/or inputs.

The CAM input object 220 may package selected values from the received input $U_E$ vector into an input vector $U_{E\_in}$. Similarly, the CAM input object 220 may package selected values from the received input into an input corrector truth vector, $Y_{Ct\_in}$. Further, the vectors $U_{E\_in}$ and $Y_{Ct\_in}$ may then be conditioned to protect the input values; this may be done by range limiting the values, by constraining the values based on instructions, and/or by performing any additional input modifications function on the vectors. The CAM input object 220 may also use the input vectors received to determine an operating mode (OpMode) for the FADEC 110. The input conditioning module 220 may output a conditioned external input vector $U_E$, a conditioned truth vector $Y_{Ct}$, and an OpMode vector.

The input validity of the vector values may be ensured by fault detection and accommodation logic (e.g., through processing from the FDA logic 117) specific to each sensor input of the CAM input object 220. The fault detection and accommodation logic detects range faults as well as in-range failures (i.e., rate-limit, cross-channel mismatch, etc.) and provides a reasonable value in all cases along with a health status indication. An example CAM input object 220 is described in greater detail below with reference to FIG. 3.

The output of CAM input object 220 is received by the CAM object 230. The CAM object 230 may contain aero-thermal representations, or component modules, of engine components. The component modules within the CAM object 230 may operate according to the system's constraints related to mathematical abstractions of physical laws that govern behavior of the apparatus 130 (i.e., laws of conservation of energy, conservation of mass, conservation of momentum, Newton's $2^{nd}$ law for rotating systems, and/or any additional known calculable physics model). The system constraints for each contained module within the CAM object 230 may have specific constraints programmed within to simulate a monitored area and/or function of the apparatus 130 (i.e., a bypass duct bleeds module, a low spool compressor module, a burner module, a parasitic power extraction module, etc.).

The CAM object 230 may use the input vectors along with internal solver states, representing on-board corrector states, solver states, and physics states, while functioning. The solver states may be introduced to address fast dynamics, resolve algebraic loops and smooth highly non-linear model elements. The CAM object 230 may output a synthesized parameters vector Y. The vector Y may be estimated in relation to the operating range determined by the CAM object 230. An example CAM object 230 is described in greater detail below with reference to FIG. 4.

The output of the CAM object 230 may be received by the CAM output object 240. The CAM output object 240 may post-process select CAM outputs that are needed by consuming control software and/or hardware. For some outputs, the CAM output object 240 may perform a unit conversion, may apply a test adder, and/or may perform interpolation between ambient conditions and/or CAM output during starting operation. The CAM output object 240 may unpack the Y vector into values specific values desired by related components (i.e., temperatures, pressures, flows, sensor temperatures, and/or other output synthesis). The CAM output object 240 may also output inter-component station flows, temperatures, pressures, and/or fuel to air ratios, torque, thrust, bleed flows, and/or compressor and turbine case clearances. The CAM output object 240 may also indicate the current status (e.g., the aforementioned "OpMode" operating mode) as determined by the EPOS 110. An example CAM output object 240 is described in greater detail below with reference to FIG. 10.

Figure 3:
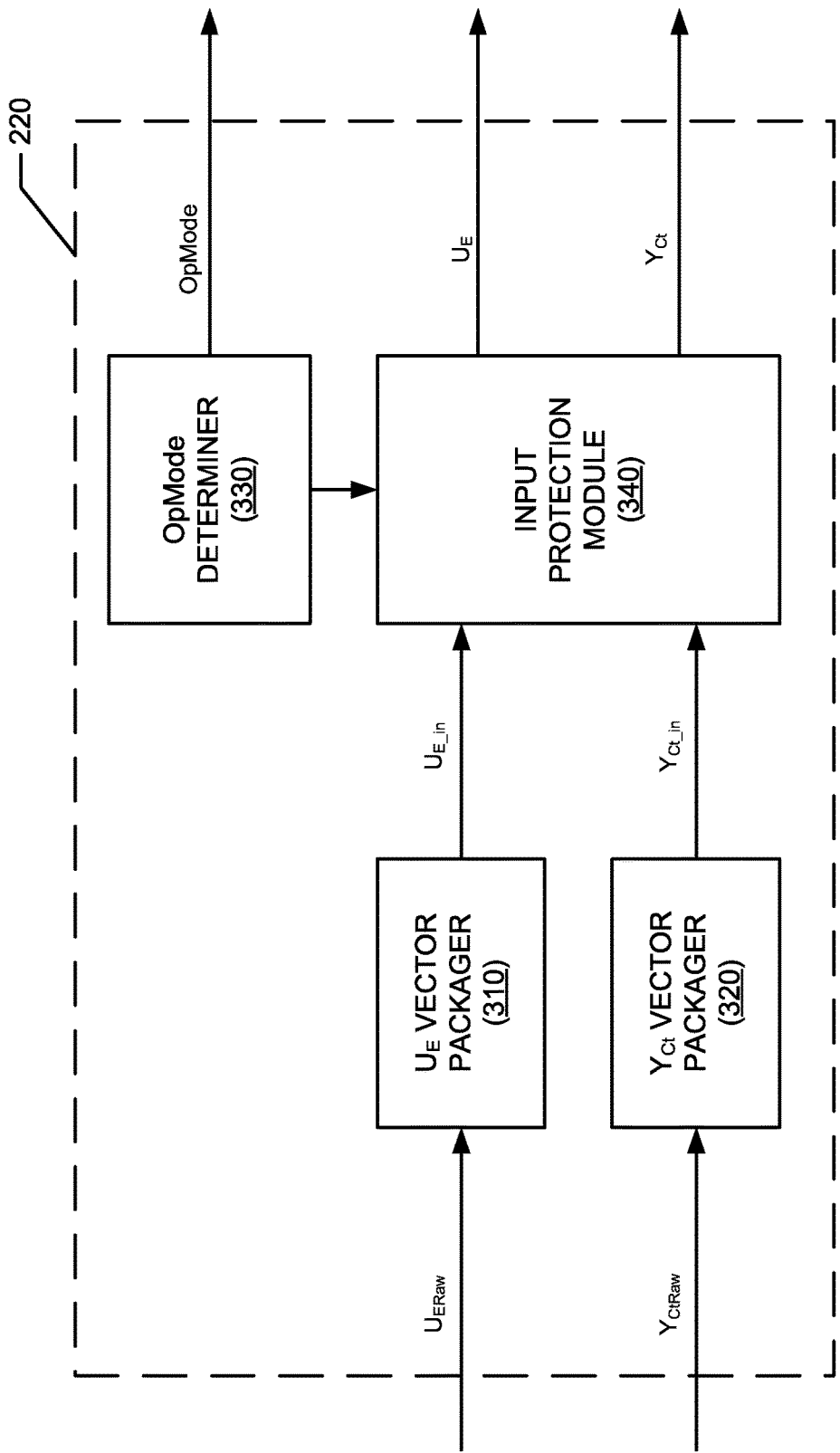
FIG. 3 is a block diagram of an exemplary CAM input object of the EPOS of FIG. 2.

Returning to the CAM input object 220, FIG. 3 illustrates an exemplary embodiment of the CAM input object 220 of FIG. 2. The CAM input object of FIG. 3 may include a $U_E$ vector packager 310, a $Y_{Ct}$ vector packager 320, an OpMode Determiner 330, and an input protection module 340. The $U_E$ vector packager may receive vector $U_{ERaw}$ and the $U_E$ vector packager 310 may select the desired values from the input vectors and may create vector $U_{E\_in}$, which may be output to the input protection module 340. The $U_E$ vector packager 310 may also be used for unit conversion and for synthesizing values for $U_E$ which may not be present. Similarly, the $Y_{Ct}$ vector packager may receive vector $Y_{CtRaw}$. The $Y_{Ct}$ vector packager 310 may select the desired values from the input vectors and may create vector $Y_{Ct\_in}$, which may be output to the input protection module 340.

The OpMode determiner 330 may establish the operating mode of the CAM object 230 based on the health status of input values that are necessary to run in each operating mode. The health status may include status of control sensors determined by the FDA logic 117, as well as internally generated information by the CAM object 230, such as conditions of internal states and outputs. The OpMode determiner 330 may operate using a logic design that seeks the highest fidelity mode based on available inputs and may fall back to decreased fidelity modes to accommodate faults. The operating mode determined by the OpMode determiner 330 is one of a programmed list of operating modes related to the function of the apparatus 130 and based on the input vector values and/or the condition of CAM states and/or outputs. The functions of various downstream elements may be affected by the resulting operating mode determined by the OpMode determiner 330.

Once the OpMode of the CAM is determined, the input protection module 340 uses the OpMode vector and the input from the vector packagers 310, 320 to determine input vectors $U_E$ and $Y_{Ct}$. Said vectors are received by the CAM object 230, illustrated in greater detail in FIG. 4.

The CAM object 230 may generate state vectors $X_C$, $X_S$, and $X_P$. The physics state vector $(X_P)$ contains simulated parameters related to dynamics of the apparatus 130 during a time of interested, whose derivatives $(X_{pDot})$ are calculated in an open loop model 410. The vector $X_P$ may include, but is not limited to including, spool shaft speeds, apparatus material temperatures, etc. The solver state vector $X_S$ may contain values related to adjustments that are made to certain components of the apparatus 130. These values may be adjustments to make up for errors coming from the CAM. The $X_C$ vector may contain values related to on-board corrector states, which are simulated component level values that are a refinement of the $Y_{Ct}$ vector to make the modeled $Y_C$ vector comparable to the real values of $Y_{Ct}$. Further, because the CAM object 230 may be implemented as a discrete real time simulation, the CAM object 230 may fully execute each dynamic pass of the simulation, each pass being denoted by letter k. The product of each simulation pass k and simulation time step dt is the simulation time. The values of k may increase sequentially by 1, (e.g. k=[1, 2, 3, . . . ]).

Figure 4:
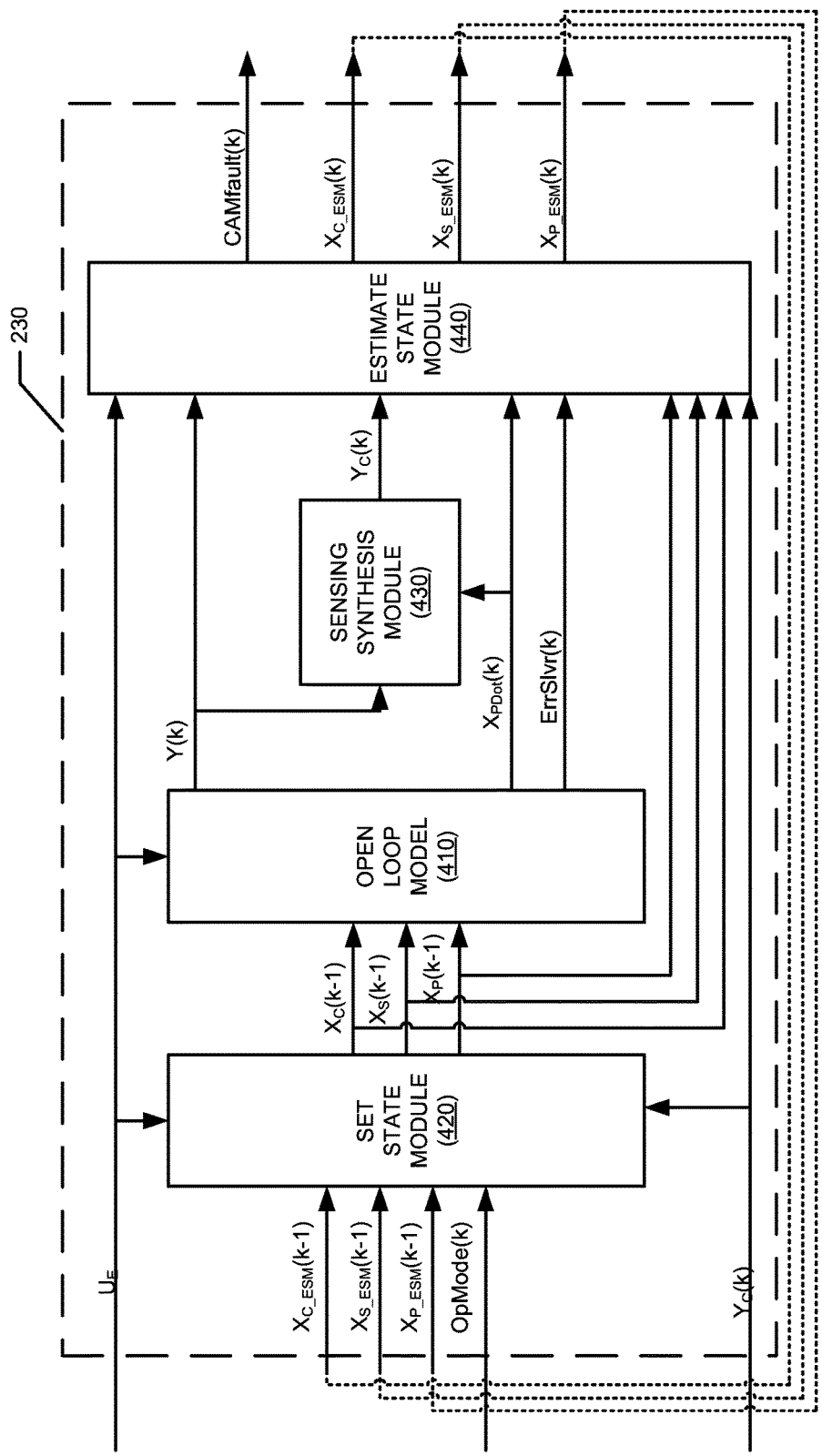
FIG. 4 is a block diagram of an exemplary compact aero-thermal (CAM) object of the EPOS of FIG. 2.

The set state module 420 may receive input of the $U_E$, $Y_{Ct}$, and OpMode vectors. Additionally, the set state module 420 may receive the prior state's values of the X vectors generated by the estimate state module 440. In FIG. 4, the prior state is denoted by the state "(k−1)." The set state module 420 may override the states in the X vectors with a base point value; however, if the values do not need an override, the set state module 420 may act as a pass through element. The override functions of the set state module 420 may override the values within the X vectors with base-point (U) or external $(Y_{Ct})$ values depending on the operating mode (OpMode) input to the CAM Module 230. To obtain override values, the set state module 420 may look up base-point values for CAM states for use during initialization. The set state module 420 may also select an active subset of solver states. As output, the set state module 420 may generate corrector state $(X_C)$, solver state $(X_S)$, and physics state $(X_P)$ vectors for use in the open loop model 410.

The open loop model 410 may consist of one or more cycle synthesis modules, each cycle synthesis module relating to a component, function, and/or condition associated with the apparatus 130. In the present example, the open loop model 410 is composed of a variety of cycle synthesis modules that may represent components, functions and/or conditions associated with a cycle of apparatus 130. The open loop module is not limited to any specific number of modules and may contain any number of modules that are used to simulate components, functions, and/or conditions associated with apparatus 130. The open loop model 410 may receive input of the corrector state $(X_C)$, solver state $(X_S)$, and physics state $(X_P)$ vectors from the set state module 420 and the effector/boundary condition vector $(U_E)$. The values input to the open loop model 410 may be used as input to the various modules simulating the components of apparatus 130. The open loop model 410 uses the values generated by the cycle synthesis modules to form a synthesized parameters vector Y(k) based on $U_E$(k) and X(k). The synthesized parameters vector Y(k) contains synthesized cycle values determined from the simulated physics of the open loop module 410 and may be used for control of the apparatus 130.

Figure 5:
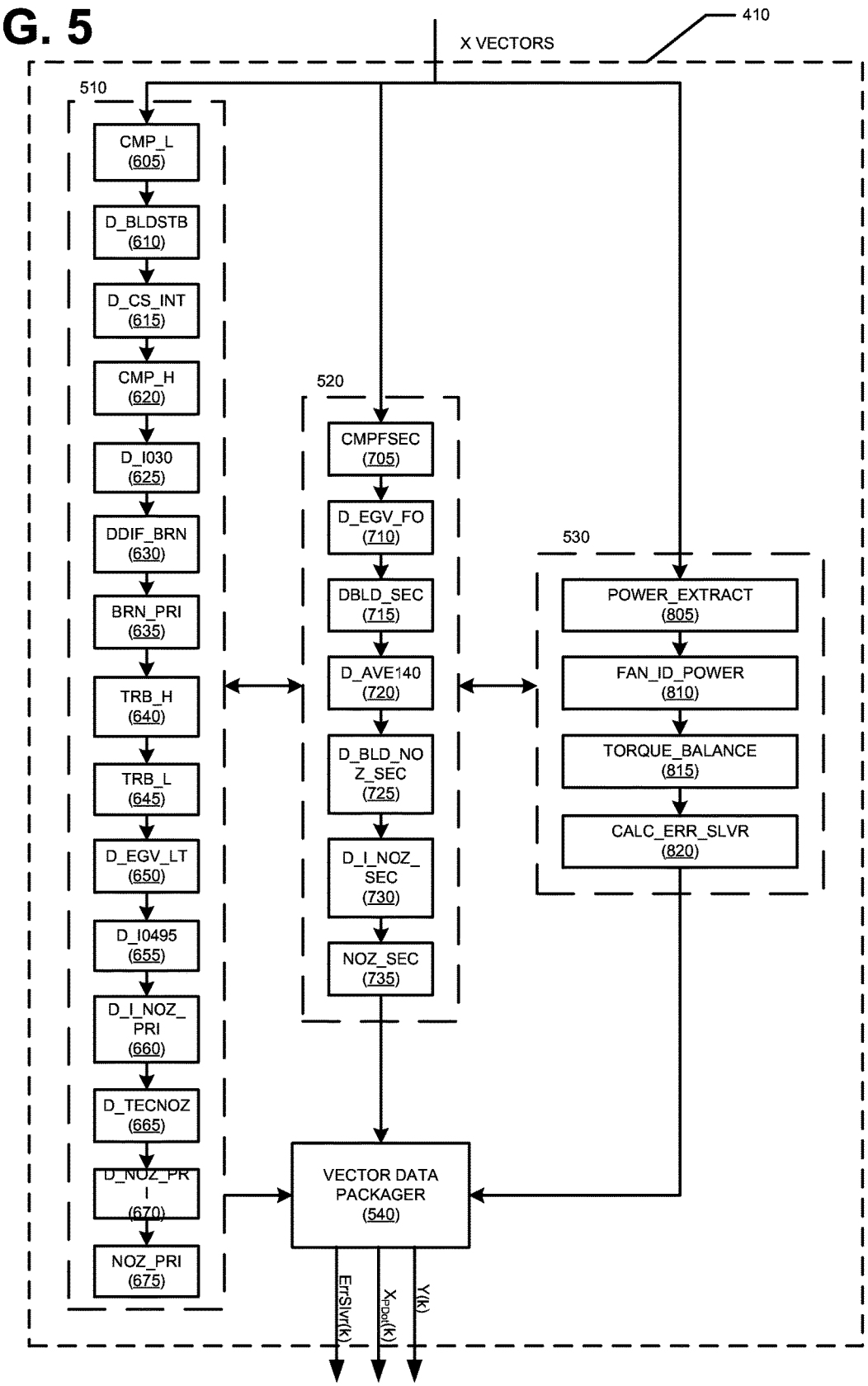
FIG. 5 is a block diagram of an exemplary open-loop model of the CAM object of FIG. 4.

Showing the series of cycle synthesis modules, FIG. 5 illustrates an example embodiment of open loop model 410 of FIG. 4. The open loop model 410 may include a group of primary stream modules 510, a group of secondary stream modules 520, a group of additional modules 530 and a vector data packager 540. The open loop model 410 may receive input of the corrector state $(X_C)$, solver state $(X_S)$, and physics state $(X_P)$ vectors, from the set state module 420, and the effector vector $(U_E)$. The group of primary stream modules 510, the group of secondary stream modules 520, and the additional modules 530 all may receive input from the corrector state $(X_C)$, solver state $(X_S)$, and physics state $(X_P)$ vectors from the set state module 420 and the effector vector $(U_E)$. Further, the open loop module 410 is not limited to including the above mentioned groups of modules, but rather, the open loop module 410 may omit groups of modules and/or include other groups of modules. Any and all modules of the open loop model 410 may interact with one another to produce the output of each module.

Each module of the open loop module 410 may represent a component of the apparatus 130 and may be implemented by a library of utilities, wherein each utility may be a mathematical representation of the physical properties that make up various parts of component calculations. For example, utilities of the modules may include representations of compressors, turbines, bleeds, pressure losses, etc. that may be reusable throughout the CAM object 230 and may improve readability and maintainability of the EPOS 110. These components may be built from physics representations of aerodynamic and thermodynamic processes. Each module may produce, for example, an output vector containing, for example, total pressure, total temperature, fuel/air ratio, and gas flow at the exit of the component, and/or any other parameter associated with the modeled portion of the apparatus 130.

In some examples, the primary stream modules 510 may include, but are not limited to including, the following based on corresponding elements of the apparatus 130: a CMP_L module 605 modeling a low spool compressor, a D_BLD_STB 610 module modeling a bleed associated with a low spool compressor, a D_CS_INT module 615 modeling a pressure loss associated with air flow passing through a duct of a compressor, a CMP_H module 620 modeling a high spool compressor, a D_I030 625 module modeling a pressure loss associated with instrumentation in a duct at the exit of a high spool compressor, a D_DIF_BURN module 630 modeling a diffuser, a BRN_PRI module 635 modeling a burner, a TRB_H module 640 modeling a high spool turbine, a TRB_L module 645 modeling a low spool turbine, a D_EGV_LT module 650 modeling a low turbine exit guide vane duct, a D_I0495 module 655 modeling pressure losses associated with probes aft of an exit guide vane duct, a D_I_NOZ_PRI module 660 modeling pressure losses related to air moving through a duct, the duct containing instrumentation probes, a D_TEC_NOZ module 665 modeling a primary nozzle duct, a D_NOZ_PRI module 670 modeling pressure losses associated with the primary nozzle duct, and a NOZ_PRI module 675 a primary nozzle. Additionally, the secondary stream modules 520 may include, but are not limited to including, the following based on corresponding elements of the apparatus 130: an example CMP_F_SEC module 705 modeling a fan outer diameter compressor, a D_EGV_FO module 710 modeling a fan exit guide vane duct, a D_BLD_SEC module 715 modeling an exit duct between a low compressor and a high compressor, a D_AVE_140 module 720 modeling a duct downstream of a B25 bleed, a D_BLD_NOZ_SEC module 725 modeling bypass duct bleeds of the apparatus 130, a D_I_NOZ_SEC module 730 modeling a secondary nozzle duct, and a NOZ_SEC module 735 modeling a secondary nozzle. Further, there are several modules that are not associated with a particular stream, the modules 530 may include, but are not limited to including, the following based on conditions of the apparatus 130: a POWER_EXTRACT module 805 modeling effects of energy and/or efficiency losses of the apparatus 130, a FAN_ID_POWER module 810 modeling an accounting for power loss from a fan gear box of the apparatus 130, and a TORQUE_BALANCE module 815 modeling an accounting for conservation of energy related to unsteady torque balance within the apparatus 130, and a CALC_ERR_SLVR module 820 that forms solutions to errors detected in the OLM 410. Further, any additional modules and/or groups of modules modeling any additional physical properties associated with the apparatus 130 may be included as part of the open loop model 410.

The example modules of FIG. 5 may be designed using one or more physic s-based configurable utilities. The configurable utilities may be contained in a library of subsystems within the EPOS structure. The open loop module 440 may compile the above mentioned modules from the subsystems of physics-based configurable utilities based on preprogrammed instructions and/or a user input.

Once data is processed throughout various modules of the open loop model 410, the vector data packager 540 receives input data from the group of primary stream modules 510, the group of secondary stream modules 520, and the additional modules 530. In addition to the synthesized parameters vector Y(k) based on the model state and input, the open loop model may also output a solver errors vector (ErrSlvr) related to the solver states vector ($X_S$). Also, the open loop model 410 may collect and output a physics state derivatives vector ($X_{pDot}$). The received data may be packaged by the vector data packager 540 in the form of vectors Y(k), ErrSlvr, and $X_{pDot}$. Further, the vector data packager may package vector data into fewer vectors and/or additional vectors.

Certain utilities used to comprise said modules of the open loop model 410 may model gas-based properties and may represent, for example, specific heat as a function of temperature and fuel/air ratio, relative pressure as a function of enthalpy and fuel/air ratio, enthalpy as a function of temperature and fuel/air ratio, specific heat ratio as a function of temperature and fuel/air ratio, relative pressure as a function of temperature and fuel/air ratio, relative pressure as a function of temperature and fuel/air ratio, temperature as a function of enthalpy and fuel/air ratio, and/or gas constant and specific heat ratio as a function of temperature and fuel/air ratio. Other example utilities may model thermal conductivity as a function of gas total temperature, the absolute viscosity as a function of gas total temperature, critical flow parameters as a function of specific heat and a gas constant, coefficients of thermal expansion as a function of material temperature and/or type, material specific heat as a function of material temperature and/or type, and/or material thermal conductivity as a function of material temperature and type. Further, other utilities modeling other gas related functions may be present. Additionally or alternatively, any other utilities modeling any other properties associated with the apparatus 130 may be included.

Additionally, the modules comprising the open loop model 410 may include one or more configurable utilities. The configurable utilities may be complex representations of engine components. For example, a configurable utility may represent a particular physical effect in major engine components such as a compressor or a turbine. Each instance of a configurable utility may be selected to be one of several representations of the physical processes it models, even though the interface of the configurable model remains unchanged. Configurable utilities may reconfigure themselves to represent a particular component by switching the underlying configurable subsystems. Using such configurable utilities may benefit the maintainability of a software application of the open loop model 430.

In an example embodiment, a configurable utility may be designed to model a Reynolds effect in the compressors of the apparatus 130 and may reconfigure itself to represent a particular component of the compressor (e.g., a high spool compressor, a low spool compressor, etc.). This example configurable, compressor Reynolds effect utility may be used in formation of cycle synthesis modules and may be used in modules simulating a low spool compressor (e.g., the CMP_L module 605 of FIG. 5), a high spool compressor (e.g., the CMP_H module 620 of FIG. 5), and/or any other module associated with a compressor simulation. Similarly, specific modules of the open loop model 410 may utilize a configurable utility to model Reynolds effect in the turbines of the apparatus 130 and may reconfigure itself to represent a particular component of the compressor.

In an example OLM 410, a specific utility may model physical processes of a compressor of the apparatus 130 and may include representations of such physical processes as sub-utilities. Sub-utilities of an example compressor utility may include, but is not limited to including, basic physics utilities associated with the basic physics of the apparatus 130 (e.g., isentropic compression, laws of thermodynamics, ideal gas properties, etc.), a component aero-thermal map evaluation, gas-material heat transfer properties, models of component bleeds, torque components from adiabatic steady-state, and/or effects of scaling between map and cycle conditions (design, gas property, Reynolds effect, clearance, untwisting effects, etc.). The output of such a compressor utility may include, but is not limited to including, component exit gas flow conditions, bleed flows, swirl angles, total component inlet gas flows, torque extracted, and derivatives of material temperatures. A compressor utility may be operatively associated with other utilities (e.g., off-board correction look up tables with selectable scheduling parameters, a selector for enabling on-board and/or off-board correction for the component, etc.) to form a compressor-related module like, for example, the CMP_L module 605 and/or the CMP_H module 620.

Another example of an OLM model utility is the turbine utility. Sub-utilities of an example turbine utility may include, but are not limited to including, basic physics utilities associated with the basic physics of the apparatus 130 (e.g., isentropic expansion, laws of thermodynamics, ideal gas properties, etc.), a component aero-thermal map evaluation, gas-material heat transfer properties, models of inlet guide vanes, models of consolidated turbine cooling bleeds, rotor inlet temperature calculation, turbine clearance effects, and/or effects of scaling between map and cycle conditions (design, gas property, Reynolds effect, clearance, untwisting effects, etc.). Outputs of such an example turbine utilities may include, but are not limited to including, component exit gas conditions, rotor inlet temperature, flows into the turbine, generated torque, material temperature derivatives, steady state material temperature at current conditions, material temperature time constants, radius of apparatus from thermal expansion, and/or clearance values. A turbine utility may be operatively associated with other utilities (e.g., off-board correction look up tables with selectable scheduling parameters, a selector for enabling on-board and/or off-board correction for the component, etc.) to form a compressor-related module like, for example, the TRB_H module 640 and/or the TRB_L module 645.

In some examples, utilities modeling a turbine, or any other rotor-based element of the apparatus 110, may account for variances in tip clearance due to changes in parameters or conditions within, for example, a turbine of the apparatus 130. Tip clearance calculations may be made within the TRB_H module 640 and/or any other module which models an aspect of the apparatus 130 which may be affected by a tip clearance variance.

A turbine tip clearance is the distance between the end of a rotating part of a turbine rotor and an outer casing of its respective turbomachinery. The tip clearance experiences variance because the materials expand and contract based on temperature changes, rotary speed changes, gas path pressure, mechanical growth, and the like. Based on the tip clearance distance variance, the dynamic performance of the engine (or, likewise, the estimation of the engine) is affected. If the clearance grows or shrinks, there will be changes to the flow and pressure values within the turbine. Dynamic tip clearance values may be modeled, for example, by the TRB_H module 640 and/or any other cycle synthesis module.

Returning to FIG. 4, the sensing synthesis module 430 may model control sensor measurements that differ from corresponding average gas path engine station estimates packaged in Y due to regime/location effects in the sensor surroundings and sensor body thermal inertia. Receiving input of Y and the derivative physics state vector ($X_{pDot}$), the sensing synthesis module 430 may act as another means of fault or error detection within the CAM module 230.

Receiving input of Y(k), $Y_C$(k), $X_{pDot}$(k), and/or ErrSlvr (k), the estimate state module 440 may use said inputs to determine the next pass value of CAM state vector X(k). The estimate state module 440 may scale and correct solver state error vector, select solver gain scheduling parameters, calculate solver state gains, calculate scale, and correct the corrector state error vector, integrate state derivatives, apply state integrator range limits, reset state integrators during initialization, detect saturated state integrators, and/or detect internal errors indicated by unreasonably large synthesized values.

The estimate state module 440 may receive input of the effector vector ($U_E$), the synthesized parameters vector (Y), the on-board corrector state vector ($X_C$), the physics state vector ($X_P$), the solver state vector ($X_S$), the solver errors vector (errSlver), and the physics state derivatives vector ($X_{pDot}$). The estimate state module 440 may output updated versions of the on-board corrector state vector ($X_{C\_ESM}$), the physics state vector ($X_{P\_ESM}$), and the solver state vector ($X_{S\_ESM}$). These vectors are the analyzed state vectors from the current iteration of the open loop model 410.

Figure 6:
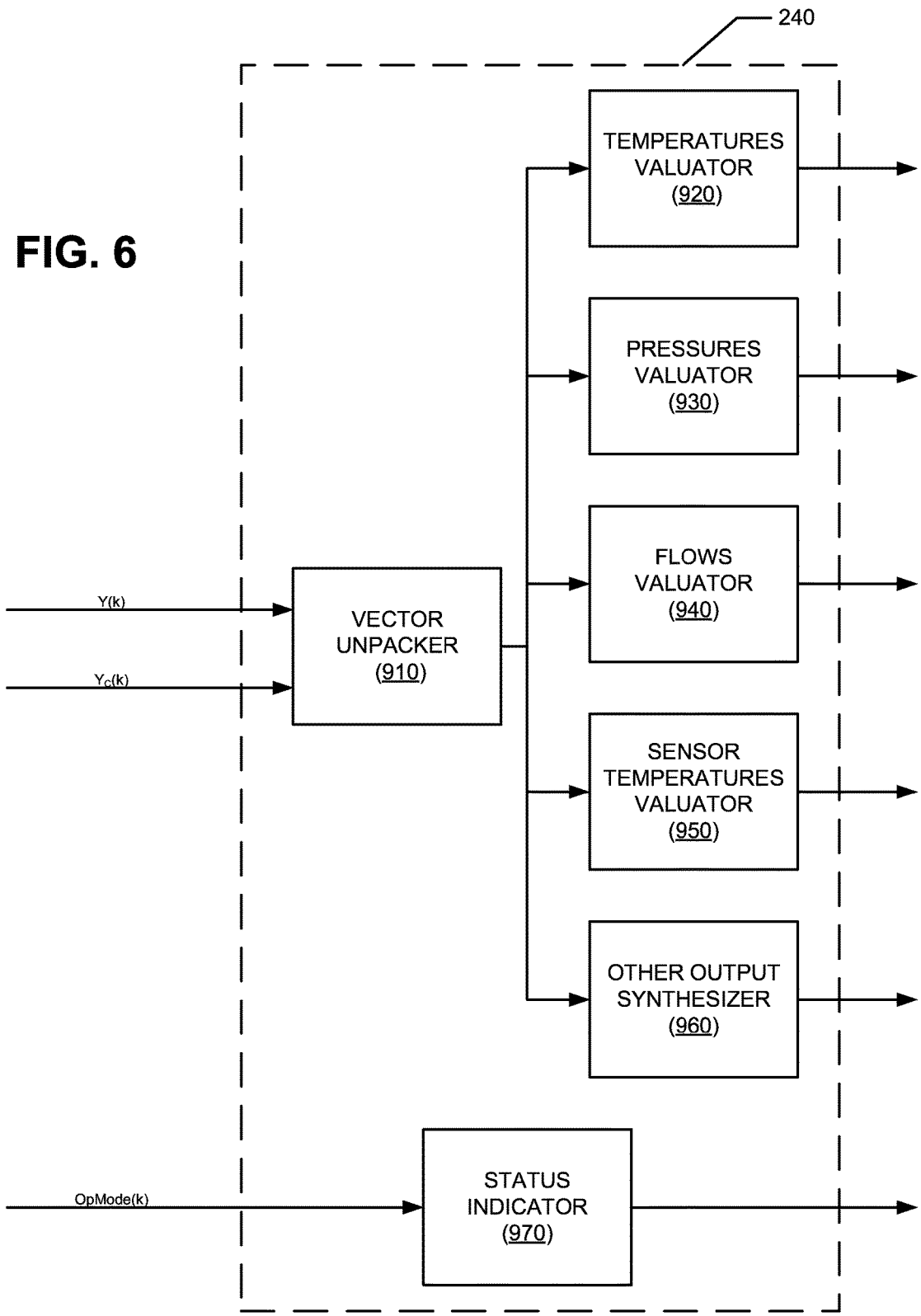
FIG. 6 is a block diagram of an exemplary output conditioning module of the EPOS of FIG. 2.

The output of the estimate state module 440 is received by the CAM output object 240, which is illustrated in FIG. 6. The CAM output object 240 may include, but is not limited to including, a vector unpacker 910, a temperatures valuator 920, a pressures valuator 930, a flows valuator 940, a sensor temperatures valuator 950, an other output synthesizer 960, and a status indicator 970. The vector unpacker 910 may receive input of the synthesized parameters vector (Y). The vector unpacker 910 may output the unpacked Y vector to other elements of the output conditioning module. The status indicator 970 may receive input of the operating mode vector (OpMode). Further, the output conditioning module 240 is not limited to including the above mentioned elements, but rather, output conditioning module 240 may omit elements and/or include other elements.

The temperatures valuator 920 may process temperature related values of the synthesized parameters vector (Y). This may include performing unit conversions, implementing test adders, performing non-linear interpolation between temperature values during the starting functions of the apparatus 130, and/or obtaining temperature values from default tables as backup if/when needed. The temperatures valuator 920 is not limited to functioning in the above mentioned manner, rather, the temperatures valuator 920 may omit any of the listed functions and/or add additional functions related to processing temperature data of the synthesized parameters vector (Y).

The pressures valuator 930 may process pressure related values of the synthesized parameters vector (Y). This may include performing unit conversions, implementing test adders, performing non-linear interpolation between pressure values during the starting functions of the apparatus 130, and/or obtaining pressure values from default tables as backup if/when needed. The pressures valuator 930 is not limited to functioning in the above mentioned manner, rather, the pressures valuator 930 may omit any of the listed functions and/or add additional functions related to processing pressure data of the synthesized parameters vector (Y).

The flows valuator 940 may process fuel flow related values of the synthesized parameters vector (Y). This may include performing unit conversions, implementing test adders, performing non-linear interpolation between fuel flow values during the starting functions of the apparatus 130, and/or obtaining fuel flow values from default tables as backup if/when needed. The flows valuator 940 is not limited to functioning in the above mentioned manner, rather, the flows valuator 940 may omit any of the listed functions and/or add additional functions related to processing fuel flow data of the synthesized parameters vector (Y).

The sensor temperatures valuator 950 may process sensor temperature related values of the synthesized parameters vector (Y). This may include performing unit conversions, implementing test adders, performing non-linear interpolation between temperature values during the starting functions of the apparatus 130, and/or obtaining sensor temperature values from default tables as backup if/when needed. The sensor temperatures valuator 950 is not limited to functioning in the above mentioned manner, rather, the sensor temperatures valuator 950 may omit any of the listed functions and/or add additional functions related to processing sensor temperature data of the synthesized parameters vector (Y).

The other output synthesizer 960 may process other output data of the synthesized parameters vector (Y) not processed by the temperatures valuator 920, the pressures valuator 930, the flows valuator 940, the sensors and/or the temperatures valuator 950. This may include performing unit conversions, implementing test adders, performing non-linear interpolation between temperature values during the starting functions of the apparatus 130, and/or obtaining other output values from default tables as backup if/when needed. The flows valuator 940 is not limited to functioning in the above mentioned manner, rather, the flows valuator 940 may omit any of the listed functions and/or add additional functions related to processing other output data of the synthesized parameters vector (Y).

The status indicator 970 may receive input from the operating mode vector (OpMode). Using this input, the status indicator 970 may generate and provide a status indication of the operating status of the CAM module 230 for use in any downstream logic devices.

The control system 100 may be implemented to monitor and/or control the tip clearance of a rotor element of the apparatus 130. Turbomachinery tip clearances are a contributor to component flow and capacity efficiency. For example, minimizing tip clearances in a turbine of the apparatus 130 may allow for a higher pressure ratio per stage of the cycle, may improve the stall margin of the apparatus 130, and/or may limit the amount of backflow around the blades of the turbine rotor. Minimizing the tip clearances may allow each turbine stage to capture more of the energy available in the flow, thus directly improving thrust specific fuel consumption. Further, knowledge of tip clearance, by a control system, may be important to preventing blade-to-case rubbing while still optimizing performance and operability of the cycle of the apparatus 130.

Using the CAM based EPOS 110, expansion and contraction of materials within the apparatus 130 can be modeled in the OLM 410. The OLM 410 may estimate the temperature and change in temperature values associated with rotor and rotor case materials of rotor-based components of the apparatus 130. The temperature and rate of change of temperature of the rotor and rotor case components may be used to estimate expansion and contraction of the rotor and rotor case components. The expansion/contraction properties of the rotor and case may be calculated based on the heat's effect on the original mass/density of the rotor and/or case. Therefore, once the expansion/contraction values are known for the rotor and rotor case, the tip clearance between them within the rotor element of the apparatus 130 can be estimated as the tip clearance distance (CLR) and the rate of change in tip clearance ($CLR_{SS}$). Other parameters associate with tip clearance may be used in calculation of the CLR and/or $CLR_{SS}$. Additionally or alternatively, the OLM 410 may monitor radial expansion by monitoring rotary speed, gas path pressures, and associated thermal and/or mechanical growth.

Figure 7:
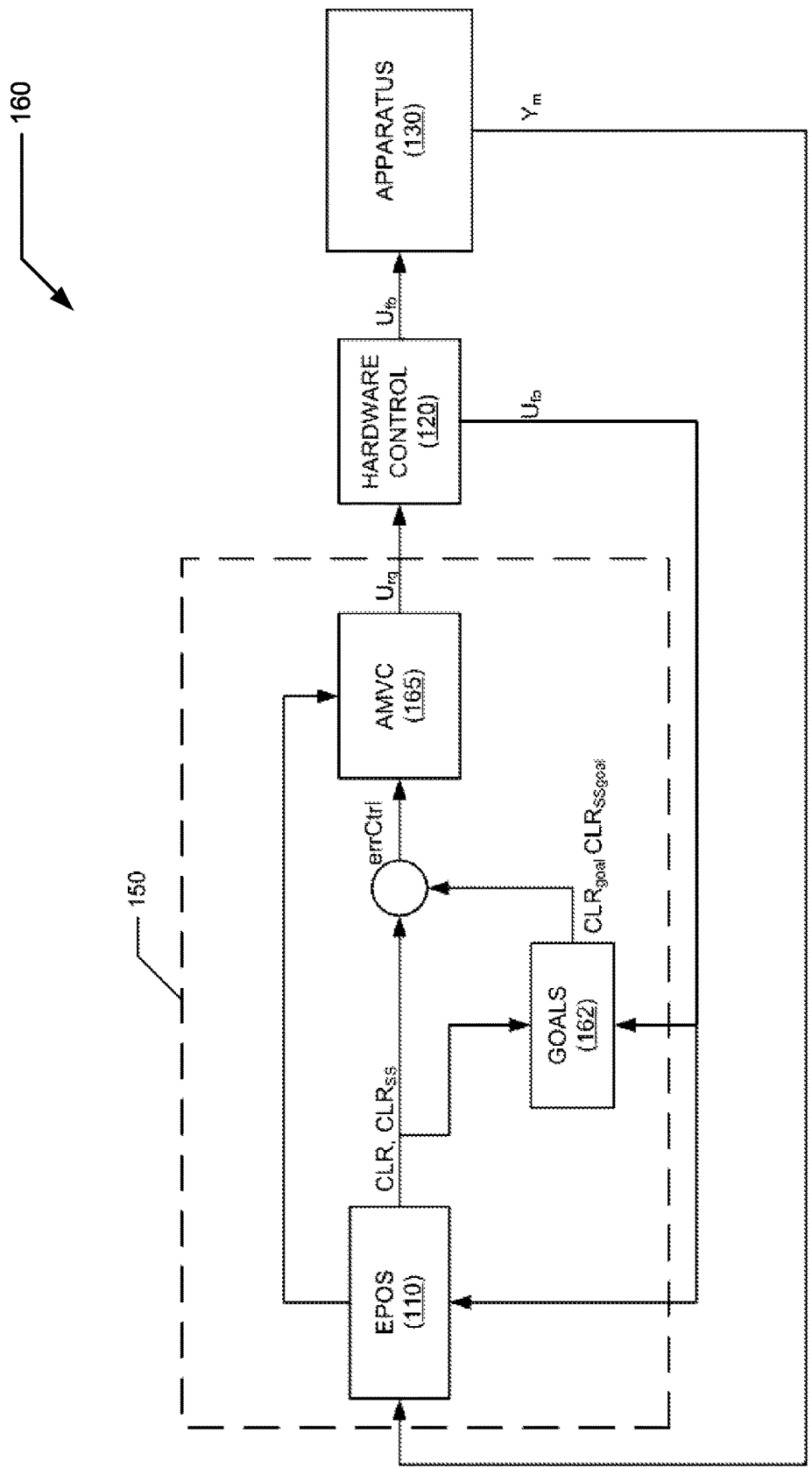
FIG. 7 is a block diagram of an exemplary control configuration for monitoring and controlling tip clearance using the control system of FIG. 1

Turning now to FIG. 7, a control configuration 160 for determining and controlling tip clearance in a rotor based element of the apparatus 130 is shown. As described in further detail above, the CAM-based EPOS 110 receives effector positions and boundary conditions ($U_{fb}$) from the apparatus 130 via the hardware control components 120. Additionally, the EPOS 110 may receive engine/cycle measurements ($Y_m$) from the apparatus 130, via one or more sensors and/or other hardware input. Using the input, the EPOS 110 generates a model output for control.

In particular, the EPOS 110 may determine a value for the tip clearance (CLR) and rate of change in tip clearance ($CLR_{SS}$) for a given rotor based element of the apparatus 130 using the model output. The rotor based element may be, for example, a turbine associated with turbomachinery, the turbine having a rotor and a case. The software control elements 150 may also determine goal values for the tip clearance ($CLR_{goal}$) and rate of change in tip clearance ($CLR_{SS\_goal}$). The goal values may be produced by the EPOS 110 and/or the goal values may be determined using input generated from the operator interface 140.

The generated values of CLR, $CLR_{SS}$, $CLR_{goal}$, and $CLR_{SSgoal}$ may be used to determine advanced multi-variable control (AMVC) instructions 165 for output to the control hardware. The AMVC 165 may be executed by the control law 111. In some examples, control error (errCtrl) processing may be applied to the input of the AMVC 165. The AMVC instructions 165 are used by hardware control elements 150, such as the actuators 124), to generate a control request ($U_{fb}$) for the apparatus 150. Using the control configuration 160, the control requests may be used to control and monitor tip clearances as described in the flowchart 980 of FIG. 8.

At block 982, the model output of the EPOS 110 may generate an estimated material temperature and/or an estimated material temperature rate of change (both values contained in the $X_f$ vector) for a rotor and a rotor case of a rotary component of the apparatus 130.). The radial growth of the rotor and the rotor case may be determined based on the temperature values and using thermodynamic laws to estimate expansion and/or contraction (block 984). Using the radial growth values, the tip clearance between the rotor and the rotor case can be determined (block 986). Additional parameters may be used when calculating tip clearance.

The tip clearance values may be determined during computations by the open loop model 410, wherein specific cycle synthesis modules pertaining to rotary elements may produce the values. The cycle synthesis modules may employ a utility from the series of utilities (e.g., a thermodynamics law utility) which determines temperatures and/or temperature rates of change for a material of a rotary element modeled by its respective cycle synthesis module.

Continuing to block 988, the control law may receive a tip clearance signal; the tip clearance signal may include the value for CLR. Using the tip clearance signal, the control law 111 may determine controls for the flow along the gas path of the gas turbine engine at a specified element based on tip clearance signal. For example, the control law 111 may direct the actuators 124 to regulate a coolant flow onto the rotor case to maintain a desired tip clearance between the rotor and the rotor case. Determinations for the controls output by the control law 111 may be based on goal values for tip clearance. Additionally or alternatively, the controls output may be based on other preprogramming and/or user input.

While an example manner of implementing the EPOS 110 of FIG. 1 has been illustrated in FIGS. 2-6, one or more elements, processes, and/or devices illustrated in FIGS. 2-6 may be combined, divided, rearranged, omitted, eliminated and/or implemented in any other way. Further, the example elements of FIGS. 1-7 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example elements are hereby expressly defined to include a tangible computer readable medium such as a memory, DVD, CD, Blu-ray, etc. storing the software and/or firmware. Further still, the example embodiments of have been illustrated in may include one or more elements, processes and/or devices in addition to, or instead of, those illustrated in FIGS. 1-7, and/or may include more than one of any or all of the illustrated elements, processes and devices.

Figure 9:
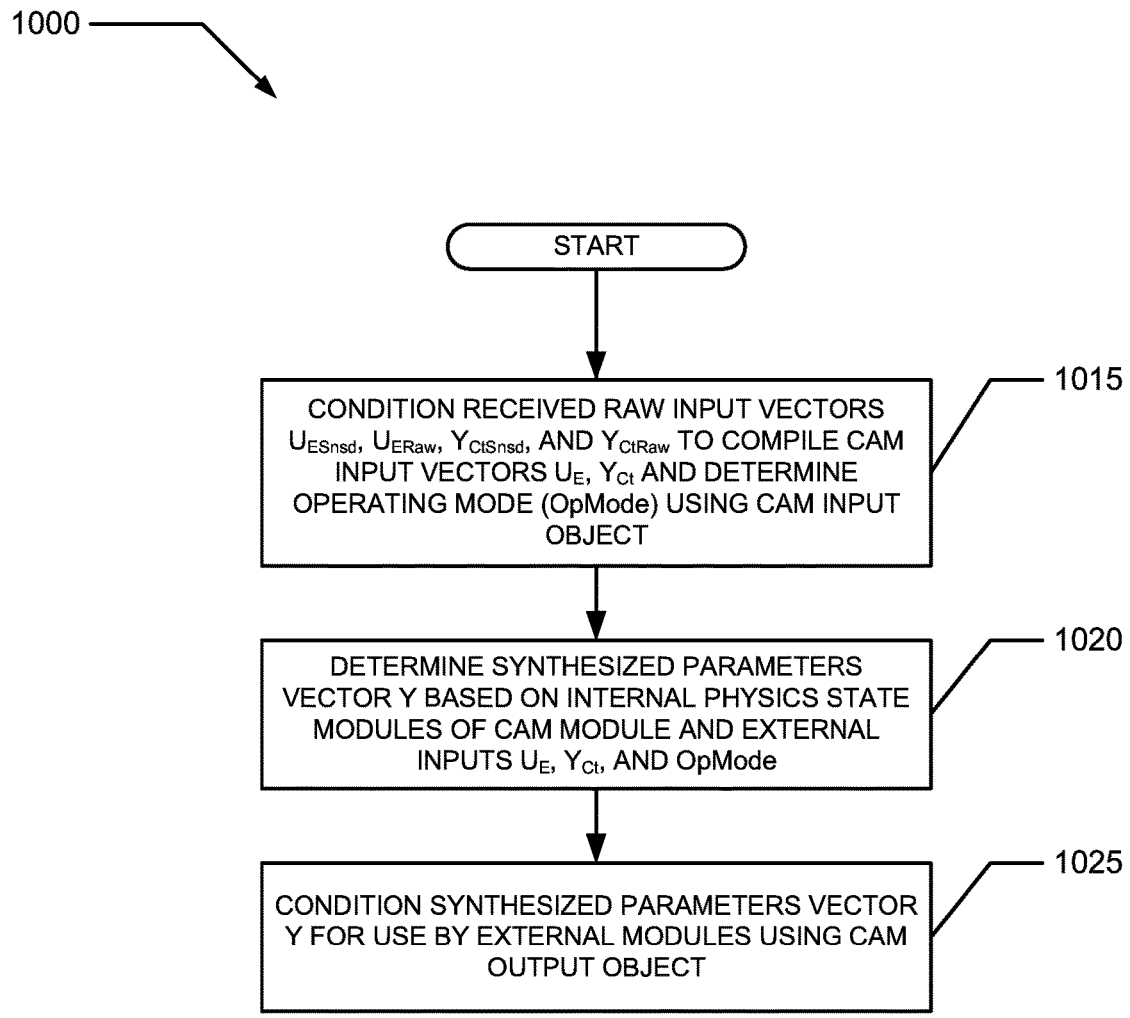
FIG. 9 is a flowchart representative of machine readable instructions that may be executed to implement the example EPOS of FIGS. 1 and/or 2.
Figure 10:
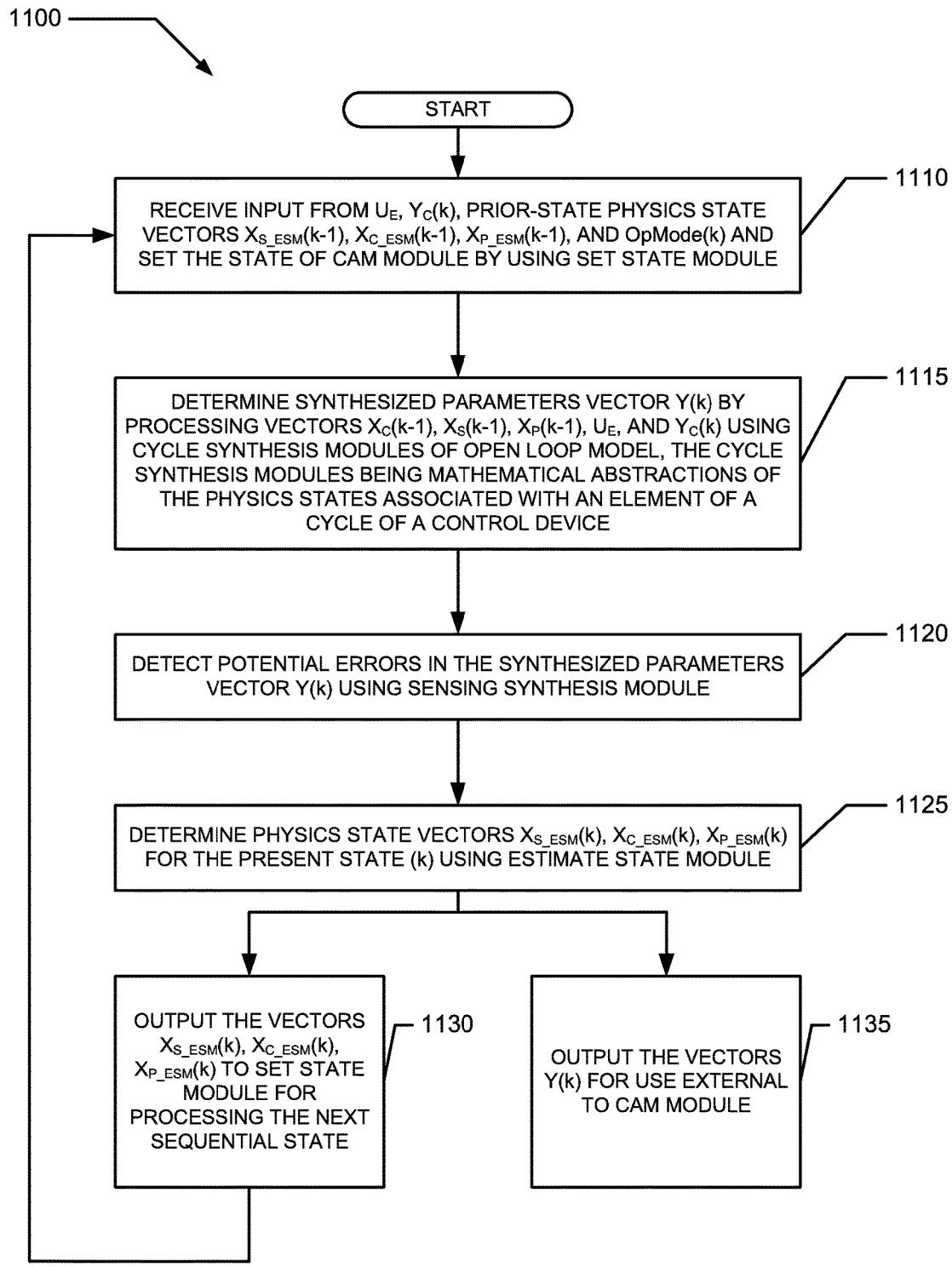
FIG. 10 is a flowchart representative of machine readable instructions that may be executed to implement the example CAM object of FIGS. 2 and/or 4.

Flowcharts representative of example machine readable instructions are shown in FIGS. 9 and 10. In these examples, the machine readable instructions comprise a program for execution by a processor such as the processor such as the processor 1210 shown in the example computer 1200 discussed below in connection with FIG. 11. The program may be embodied in software stored on a tangible computer readable medium such as a CD-ROM, a floppy disk, a hard drive, a digital versatile disk (DVD), a Blu-ray disk, or a memory associated with the processor 1210, but the entire program and/or parts thereof could alternatively be executed by a device other than the processor 1210 and/or embodied in firmware or dedicated hardware. Further, although the example programs are described with reference to the flowcharts illustrated in FIGS. 9 and 10, many other methods of implementing embodiments of the present disclosure may alternatively be used. For example, the order of execution of the blocks may be changed, and/or some of the blocks described may be changed, eliminated, or combined.

With reference to FIG. 9, example machine readable instructions 1000 may be executed to implement the EPOS 110 of FIGS. 1 and/or 2. With reference to FIGS. 1 and/or 2, the example machine readable instructions 1000 begin execution at block 1010 at input vectors are received by the CAM input object 220 and are used by the CAM input object 220 to determine the operating mode (OpMode) of the simulation and to compile the CAM input vectors $U_E$ and $Y_{Ct}$ (block 1015). The CAM input vectors are then used by the CAM object 230 to determine synthesized parameters vector Y based on internal physics state module of the CAM module 230 and the external inputs $U_E$, $Y_{Ct}$, and OpMode (block 1020). The synthesized parameters vector Y is conditioned by the CAM output object 240 for use by external modules such as, for example, the control law 123 of FIG. 1 (block 1025).

The example machine readable instructions 1100 of FIG. 10 may be executed to implement the CAM object 230 of FIGS. 2 and/or 4. With reference to FIGS. 2 and/or 4, the set state module receives input from and sets the state of the CAM object 230 based upon vectors $U_E$, $Y_C(k)$, OpMode, and prior physics state vectors generated by the estimate state module 440 in the form of $X_{E\_ESM}(k-1)$, $X_{C\_ESM}(k-1)$, and $X_{P\_ESM}(k-1)$ (block 1110). The open loop model 410 determines synthesized parameters vector Y(k) by processing data contained in $U_E$, $Y_C(k)$, $X_C(k-1)$, $X_S(k-1)$, and $X_P(k-1)$ using one or more contained cycle synthesis modules, the one or more cycle synthesis modules being a mathematical abstraction(s) of the physics states associated with an element of a cycle of the apparatus 130 (block 1115). The sensing synthesis module 430 receives the synthesized parameters vector Y(k) and detects potential errors in the vector (block 1120). The estimate state module 440 determines the physics state vectors $X_{S\_ESM}(k)$, $X_{C\_ESM}(k)$, and $X_{P\_ESM}(k)$ for the present state (k) (block 1125). The estimate state module 440 outputs the vectors $X_{S\_ESM}(k)$, $X_{C\_ESM}(k)$, and $X_{P\_ESM}(k)$ to the set state module 420 for processing the next sequential state (block 1130). The estimate state module 440 outputs the vector Y(k) for use external to the CAM module 230 (block 1135).

Figure 8:
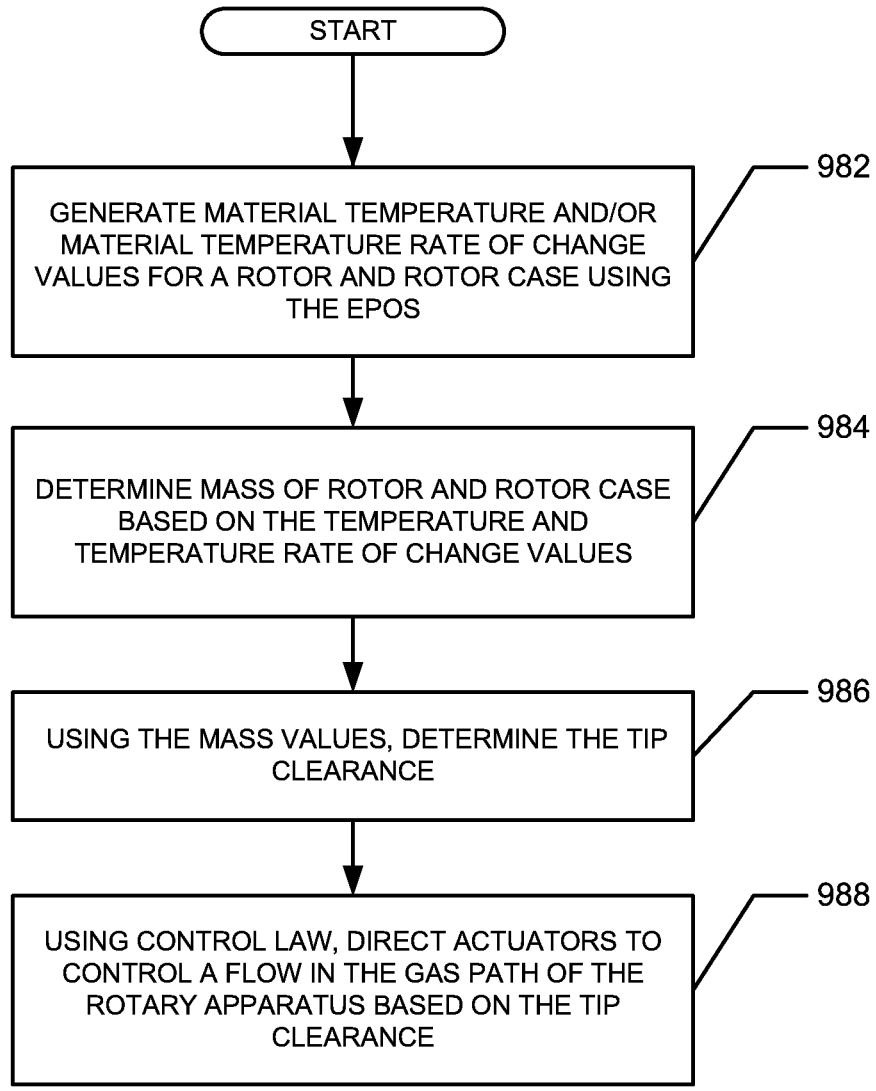
FIG. 8 is a flowchart representative of a method for monitoring and controlling tip clearance using the control configuration of FIG. 7.
Figure 11:
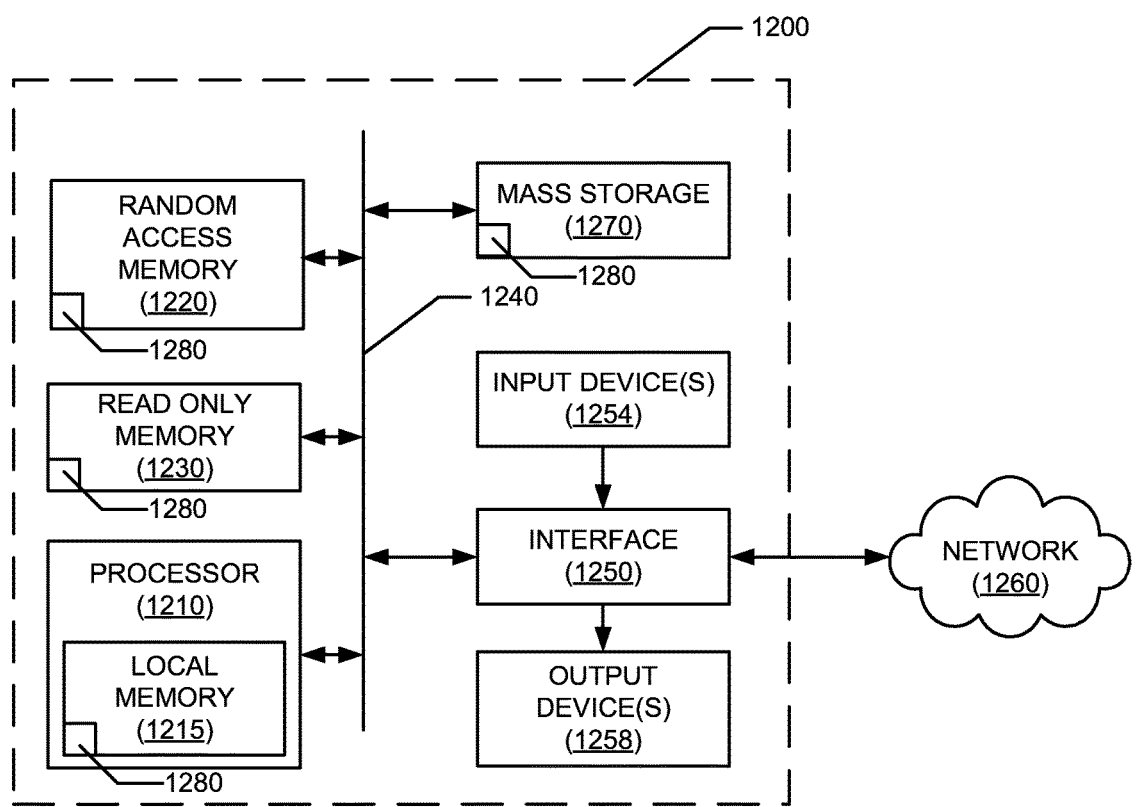
FIG. 11 is a block diagram of an example processing system that may execute the example machine readable instructions of FIGS. 7-8 and/or any elements of the present disclosure herein.

FIG. 11 is a block diagram of an example computer 1200 capable of executing the instructions of FIGS. 8-9 to implement the apparatus of FIGS. 1-7. The computer 1200 can be, for example, a server, a personal computer, or any other type of computing device.

The system 1200 of the instant example includes a processor 1210. For example, the processor 1210 can be implemented by one or more microprocessors or controllers from any desired family or manufacturer.

The processor 1210 includes a local memory 1215 and is in communication with a main memory including a read only memory 1230 and a random access memory 1220 via a bus 1240. The random access memory 1220 may be implemented by Synchronous Dynamic Random Access Memory (SDRAM), Dynamic Random Access Memory (DRAM), RAMBUS Dynamic Random Access Memory (RDRM) and/or any other type of random access memory device. The read only memory 1230 may be implemented by a hard drive, flash memory and/or any other desired type of memory device.

The computer 1200 also includes an interface circuit 1250. The interface circuit 1230 may be implemented by any type of interface standard, such as an Ethernet interface, a universal serial bus (USB), and/or a PCI express interface.

One or more input devices 1254 are connected to the interface circuit 1250. The input device(s) 1254 permit a user to enter data and commands into the processor 1210. The input device(s) can be implemented by, for example, a keyboard, a mouse, a touchscreen, a track-pad, a trackball, isopoint and/or a voice recognition system. The interface 1250 may operate in conjunction with, in parallel with, or in place of, the operator interface 115 of FIG. 1.

One or more output devices 1258 are also connected to the interface circuit 1250. The output devices 1258 can be implemented by, for example, display devices for associated data (e.g., a liquid crystal display, a cathode ray tube display (CRT), etc.), and/or an actuator operatively associated with a fluid-based engineering system such as gas turbine engines for aviation and power generation, HVAC&R (heating, ventilation, air-conditioning and refrigeration), fuel cells, and other, more generalized fluid processing systems for hydrocarbon extraction, materials processing, and manufacture.

INDUSTRIAL APPLICABILITY

From the foregoing, it can be seen that the technology disclosed herein has industrial applicability in a variety of settings such as, but not limited to, systems and methods for controlling a fluid based engineering system. Example fluid-based engineering systems may include gas turbine engines for aviation and power generation, HVAC&R (heating, ventilation, air-conditioning and refrigeration), fuel cells, and other, more generalized fluid processing systems for hydrocarbon extraction, materials processing, and manufacture. Using the teachings of the present disclosure, compact aero-thermal models of fluid-based engineering systems may be designed to reduce computational load on a system's control device and/or on board processor. The efficiency of such a model may be improved through the use of a series of utilities, the utilities based on mathematical abstractions of physical properties associated with components of the engineering system. This improvement over the prior art may conserve computational efficiency and may improve the accuracy of the control system for fluid based engineering systems.

While the present disclosure has been in reference to a gas turbine engine of an aircraft, one skilled in the art will understand that the teachings herein can be used in other applications as well, as mentioned above. It is therefore intended that the scope of the invention not be limited by the embodiments presented herein as the best mode for carrying out the invention, but that the invention will include all equivalents falling within the spirit and scope of the claims as well.

What is claimed is:

1. A control system, comprising:
    an actuator for positioning a control device, the control device comprising a rotary apparatus including a rotor and a rotor case, wherein the actuator positions the control device;
    a control law configured to direct the actuator as a function of a model output; and
    a model processor configured to generate the model output, the model processor comprising:
        an input object for processing a model input vector and setting a model operating mode;
        a set state module for setting dynamic states of the model processor, the dynamic states input to an open loop model based on the model operating mode;
        wherein the open loop model generates current state derivatives, solver state errors, and synthesized parameters as a function of the dynamic states and the model input vector, wherein the open loop model constrains the current state derivatives and solver state errors based on a series of cycle synthesis modules, each member of the series of cycle synthesis modules modeling a component of a cycle of the control device and comprising a series of utilities, the utilities based on mathematical abstractions of physical laws that govern behavior of the component, the series of cycle synthesis modules including a rotary apparatus module which estimates a tip clearance between the rotor and the rotor case;
        an estimate state module configured to determine an estimated state of the model based on at least one of a prior state, the current state derivatives, the solver state errors, and the synthesized parameters; and
        an output object for processing at least the synthesized parameters of the model to determine the model output.

2. The control system of claim 1, wherein the rotary apparatus module estimates temperature and rate of temperature change values for the rotor and temperature and rate of temperature change values for the rotor case.

3. The control system of claim 2, wherein the rotary apparatus module estimates a radial growth of the rotor based on the temperature and rate of temperature change values for the rotor and estimates a radial growth of the rotor case based on the temperature and rate of temperature change values for the rotor case.

4. The control system of claim 3, wherein the rotary apparatus module estimates the tip clearance between the rotor and the rotor case based on the estimated radial growth of the rotor and the estimated radial growth of the rotor case.

5. The control system of claim 1, wherein the control law directs the actuators to control a flow in a gas path of the rotary apparatus based on the tip clearance.

6. The control system of claim 5, wherein the control law directs the actuator to regulate a coolant flow onto the rotor case to maintain a desired tip clearance between the rotor and the rotor case.

7. The control system of claim 1, wherein the rotary apparatus includes at least one of a compressor element or a turbine element.

8. The control system of claim 1, wherein the estimated tip clearance is based on one or more of material temperature estimations, rotary speed calculations, gas path pressure estimations, and mechanical growth estimations.

9. The control system of claim 1, wherein the control device is a gas turbine engine.

10. A method for controlling a control device, the control device comprising a rotary apparatus including a rotor and a rotor case, the method comprising:
    generating a model output using a model processor;
    processing a model input vector and setting a model operating mode;
    setting dynamic states of the model processor, the dynamic states input to an open loop model based on the model operating mode;
    generating current state derivatives, solver state errors, and synthesized parameters as a function of the dynamic states and the model input vector by an open loop model that constrains the current state derivatives and solver state errors based on a series of cycle synthesis modules, each member of the series of cycle synthesis modules modeling a component of a cycle of the control device and comprising a series of utilities, the utilities based on mathematical abstractions of physical laws that govern behavior of the component, the series of cycle synthesis modules including a rotary apparatus module which estimates a tip clearance between the rotor and the rotor case;
    determining an estimated state of the model based on at least one of a prior state, the current state derivatives, the solver state errors, and the synthesized parameters;
    processing at least the synthesized parameters of the model to determine the model output;

directing an actuator associated with the control device as a function of a model output using a control law; and positioning a control device comprising a control surface using the actuator, wherein the actuator positions the control surface.

11. The method claim 10, wherein the rotary apparatus module estimates temperature and rate of temperature change values for the rotor and temperature and rate of temperature change values for the rotor case.

12. The method of claim 11, wherein the rotary apparatus module estimates a radial growth of the rotor based on the temperature and rate of temperature change values for the rotor and estimates a radial growth of the rotor case based on the temperature and rate of temperature change values for the rotor case.

13. The method of claim 12, wherein the rotary apparatus module estimates the tip clearance between the rotor and the rotor case based on the radial growth of the rotor and the radial growth of the rotor case.

14. The method of claim 10, wherein the control device is a gas turbine engine and the one or more cycle synthesis modules are based on one or more mathematical abstractions of physical laws that govern behavior of components of a thermodynamic cycle of the gas turbine engine.

15. The method of claim 10, further comprising directing the actuator, using the control law, to regulate a coolant flow onto the rotor case to maintain a desired tip clearance between the rotor and the rotor case based on the estimated tip clearance.

16. A gas turbine engine comprising:
an actuator for positioning the gas turbine engine comprising a control surface, wherein the actuator positions a control surface of an element of the gas turbine engine;
a control law configured to direct the actuator as a function of a model output;
a model processor configured to generate the model output, the model processor comprising:
an input object for processing a model input vector and setting a model operating mode;
a set state module for setting dynamic states of the model processor, the dynamic states input to an open loop model based on the model operating mode;
wherein the open loop model generates current state derivatives, solver state errors, and synthesized parameters as a function of the dynamic states and the model input vector, wherein the open loop model constrains the current state derivatives and solver state errors based on a series of cycle synthesis modules, each member of the series of cycle synthesis modules modeling a component of a cycle of the gas turbine engine and comprising a series of utilities, the utilities based on mathematical abstractions of physical laws that govern behavior of the component, the series of cycle synthesis modules including a turbine module, which estimates a tip clearance between a turbine rotor and a turbine case of the gas turbine engine;
an estimate state module configured to determine an estimated state of the model based on at least one of a prior state, the current state derivatives, the solver state errors, and the synthesized parameters; and
an output object for processing at least the synthesized parameters of the model to determine the model output.

17. The gas turbine engine of claim 16, wherein the turbine module estimates temperature and rate of temperature change values for the turbine rotor and temperature and rate of temperature change values for the turbine case.

18. The gas turbine engine of claim 17, wherein the turbine module estimates a radial growth of the turbine rotor based on the temperature and rate of temperature change values for the turbine rotor and estimates a radial growth of the turbine case based on the temperature and rate of temperature change values for the turbine case.

19. The gas turbine engine of claim 18, wherein the turbine module estimates the tip clearance between the turbine rotor and the turbine case based on a mass of the rotor and a mass of the rotor case.

20. The gas turbine engine of claim 16, wherein the control law directs the actuator to regulate a coolant flow onto the turbine case to maintain a desired tip clearance between the turbine rotor and the turbine case.

* * * * *